(12) United States Patent
Chen et al.

(10) Patent No.: US 9,104,014 B2
(45) Date of Patent: Aug. 11, 2015

(54) IMAGING LENS SYSTEM AND IMAGE CAPTURING DEVICE

(71) Applicant: LARGAN PRECISION CO., LTD., Taichung (TW)

(72) Inventors: Kuan-Ming Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/632,258

(22) Filed: Feb. 26, 2015

(65) Prior Publication Data

US 2015/0168689 A1   Jun. 18, 2015

Related U.S. Application Data

(63) Continuation of application No. 13/916,605, filed on Jun. 13, 2013, now Pat. No. 9,001,434.

(30) Foreign Application Priority Data

May 30, 2013   (TW) .............................. 102119136 A

(51) Int. Cl.
   H04N 5/225   (2006.01)
   G02B 13/00   (2006.01)
   G02B 9/62    (2006.01)

(52) U.S. Cl.
   CPC .............. *G02B 13/0045* (2013.01); *G02B 9/62* (2013.01); *H04N 5/2254* (2013.01)

(58) Field of Classification Search
   CPC ..... H04N 5/2254; G02B 13/0045; G02B 9/62
   See application file for complete search history.

(56) References Cited

U.S. PATENT DOCUMENTS

| | | | |
|---|---|---|---|
| 8,212,913 B2 * | 7/2012 | Yoshitsugu et al. | 348/335 |
| 8,854,745 B1 * | 10/2014 | Chen | 359/713 |
| 2013/0335833 A1 * | 12/2013 | Liao et al. | 359/713 |
| 2013/0342918 A1 | 12/2013 | Kubota et al. | |
| 2014/0002688 A1 | 1/2014 | Inoue et al. | |
| 2014/0063616 A1 | 3/2014 | Okano et al. | |
| 2014/0071543 A1 | 3/2014 | Shinohara | |
| 2014/0078603 A1 | 3/2014 | You | |
| 2014/0253782 A1 * | 9/2014 | Tsai et al. | 348/335 |

FOREIGN PATENT DOCUMENTS

WO   2014-175058   10/2014

* cited by examiner

*Primary Examiner* — Lin Ye
*Assistant Examiner* — John H Morehead, III
(74) *Attorney, Agent, or Firm* — McClure, Qualey & Rodack, LLP

(57) ABSTRACT

An imaging lens system includes six non-cemented lens elements with refractive power, in order from an object side to an image side, a first lens element, a second lens element, a third lens element, a fourth lens element, a fifth lens element and a sixth lens element. The first lens element has positive refractive power. The second lens element has refractive power. The third lens element has positive refractive power. The fourth lens element has refractive power. The fifth lens element has refractive power, wherein both of the surfaces thereof are aspheric. The sixth lens element with refractive power has a concave image-side surface in a paraxial region thereof, wherein the image-side surface has at least one convex shape in an off-axis region thereof, and both of the surfaces thereof are aspheric. The imaging lens system has a total of six lens elements with refractive power.

30 Claims, 16 Drawing Sheets

IMAGING LENS SYSTEM AND IMAGE CAPTURING DEVICE

RELATED APPLICATIONS

The present application is a continuation of the application Ser. No. 13/916,605, filed Jun. 13, 2013, the entire contents of which are hereby incorporated herein by reference, which claims priority to Taiwan Application Serial Number 102119136, filed May 30, 2013, all of which are herein incorporated by reference.

BACKGROUND

1. Technical Field

The present disclosure relates to an imaging lens system. More particularly, the present disclosure relates to a compact imaging lens system applicable to electronic products.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile products with high-end specifications, such as smart phones and tablet personal computers, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the axial distance between the first lens element and the second lens element tends to cause problems in assembling. Moreover, most of the refractive powers center on the object-side of the optical systems which might result in worse image quality due to high sensitivity of tolerance.

SUMMARY

According to one aspect of the present disclosure, an imaging lens system includes six non-cemented lens elements with refractive power, in order from an object side to an image side, a first lens element, a second lens element, a third lens element, a fourth lens element, a fifth lens element and a sixth lens element. The first lens element has positive refractive power. The second lens element has refractive power. The third lens element has positive refractive power. The fourth lens element has refractive power. The fifth lens element has refractive power, wherein both of an object-side surface and an image-side surface of the fifth lens element are aspheric. The sixth lens element with refractive power has a concave image-side surface in a paraxial region thereof, wherein the image-side surface of the sixth lens element has at least one convex shape in an off-axis region thereof, and both of an object-side surface and the image-side surface of the sixth lens element are aspheric. The imaging lens system has a total of six lens elements with refractive power. When a focal length of the first lens element is f1, a focal length of the third lens element is f3, a curvature radius of the object-side surface of the fifth lens element is R9, a curvature radius of the image-side surface of the fifth lens element is R10, a central thickness of the first lens element is CT1, and an axial distance between the first lens element and the second lens element is T12, the following relationships are satisfied:

$0<f3/f1<1.1;$ $|R9/R10|<3.0;$ and $0.90<T12/CT1<3.0.$

According to another aspect of the present disclosure, an imaging lens system includes six non-cemented lens elements with refractive power, in order from an object side to an image side, a first lens element, a second lens element, a third lens element, a fourth lens element, a fifth lens element and a sixth lens element. The first lens element has positive refractive power. The second lens element has negative refractive power. The third lens element has positive refractive power. The fourth lens element with refractive power has a concave object-side surface and a convex image-side surface. The fifth lens element with refractive power has a convex object-side surface, wherein both of an object-side surface and an image-side surface of the fifth lens element are aspheric. The sixth lens element with refractive power has a concave image-side surface in a paraxial region thereof, wherein the image-side surface of the sixth lens element has at least one convex shape in an off-axis region thereof, and both of an object-side surface and the image-side surface of the sixth lens element are aspheric. The imaging lens system has a total of six lens elements with refractive power. When a focal length of the first lens element is f1, a focal length of the third lens element is f3, a curvature radius of the object-side surface of the fifth lens element is R9, a curvature radius of the image-side surface of the fifth lens element is R10, a curvature radius of the object-side surface of the sixth lens element is R11, and a curvature radius of the image-side surface of the sixth lens element is R12, the following relationships are satisfied:

$0<f3/f1<1.1;$ $|R9/R10|<3.0;$ and $-1.0<(R11+R12)/(R11-R12)<2.75.$

According to still another aspect of the present disclosure, an image capturing device includes the imaging lens system according to said aspect and an image sensor. The image sensor is located on an image plane side of said imaging lens system.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
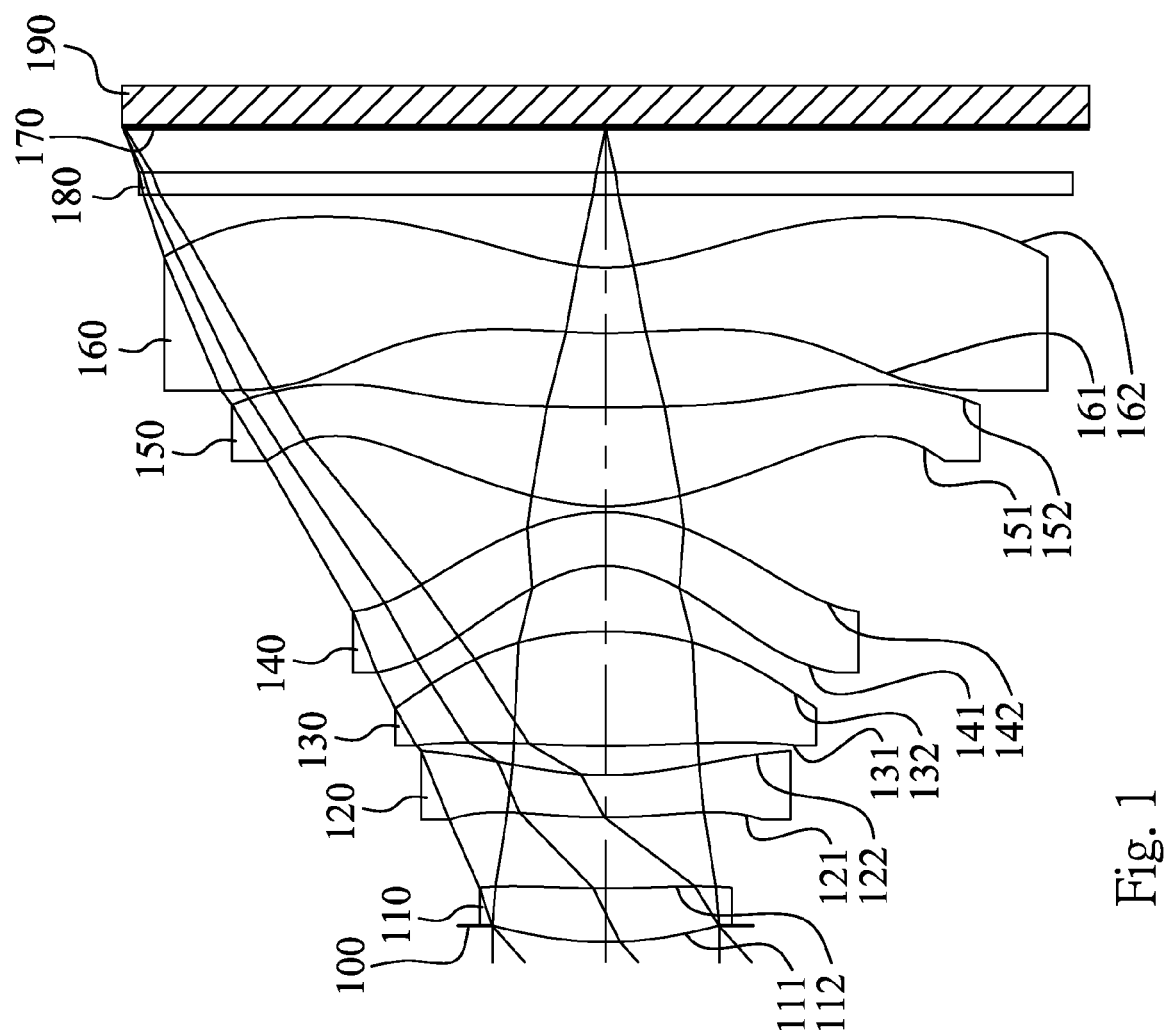
FIG. 1 is a schematic view of an imaging lens system according to the 1st embodiment of the present disclosure.

An imaging lens system includes six non-cemented lens elements with refractive power, in order from an object side to an image side, a first lens element, a second lens element, a third lens element, a fourth lens element, a fifth lens element and a sixth lens element. The imaging lens system has a total of six lens elements with refractive power and further includes an image sensor located on an image plane.

The first lens element, the second lens element, the third lens element, the fourth lens element, the fifth lens element, and the sixth lens element are six non-cemented lens elements with refractive power. That is, any two lens elements adjacent to each other are not cemented, and there is an air space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the imaging lens system. Therefore, the imaging lens system of the present disclosure provides six non-cemented lens elements for improving the problem generated by the cemented lens elements.

The imaging lens system can further include a stop, such as an aperture stop, and the image sensor. The stop can be disposed between an imaged object and the second lens element, and the image sensor can be located on the image plane, wherein the image sensor has a resolution of at least 10 megapixels so as to improve image quality.

The first lens element with positive refractive power can have a convex object-side surface. Therefore, it is favorable for properly adjusting the positive refractive power of the first lens element so as to reduce the total track length of the imaging lens system.

The second lens element can have negative refractive power, a convex object-side surface and a concave image-side surface, so that the aberration generated by the first lens element can be corrected.

The third lens element with positive refractive power can have a convex image-side surface. Therefore, the positive refractive power of the first lens element can be balanced for avoiding the excessive spherical aberration and reducing the photosensitivity of the imaging lens system.

The fourth lens element can have negative refractive power, a concave object-side surface and a convex image-side surface. Therefore, the Petzval sum and the astigmatism of the imaging lens system can be corrected effectively so as to correct the image curvature.

The fifth lens element can have positive refractive power, a convex object-side surface in a paraxial region thereof, wherein the object-side surface of the fifth lens element has at least one concave shape in an off-axis region thereof. Therefore, the spherical aberration can be effectively corrected, and the coma aberration together with the astigmatism from the off-axis field can also be corrected.

The sixth lens element can have negative refractive power, and has a concave image-side surface in a paraxial region thereof, wherein the image-side surface of the sixth lens element has at least one convex shape in an off-axis region thereof. Therefore, the principal point of the imaging lens system can be positioned away from the image plane, and the back focal length thereof can be reduced so as to keep the imaging lens system compact. Furthermore, the incident angle of the off-axis on the image plane can be reduced in order to correct the aberration of the off-axis.

When a focal length of the first lens element is f1, and a focal length of the third lens element is f3, the following relationship is satisfied: $0 < f3/f1 < 1.1$. Therefore, it is favorable for avoiding overloading the refractive power on the lens elements which are close to the object-side of the imaging lens system so as to reduce the sensitivity of tolerance. Preferably, the following relationship is satisfied:

$$0.20 < f3/f1 < 0.85.$$

When a curvature radius of the object-side surface of the fifth lens element is R9, and a curvature radius of the image-side surface of the fifth lens element is R10, the following relationship is satisfied: $|R9/R10| < 3.0$. Therefore, it is favorable for effectively correct the astigmatism and the spherical aberration. Preferably, the following relationship is satisfied:

$$|R9/R10| < 1.0.$$

When a central thickness of the first lens element is CT1, and an axial distance between the first lens element and the second lens element is T12, the following relationship is satisfied: $0.90 < T12/CT1 < 3.0$. A proper axial distance between the first lens element and the second lens element is favorable for avoiding tiny axial distance between the first and the second lens elements during assembling.

When a central thickness of the second lens element is CT2, and the axial distance between the first lens element and the second lens element is T12, the following relationship is satisfied: $1.20 < T12/CT2 < 3.0$. It is favorable for avoiding tiny axial distance between lens elements during assembling so as to maintain the imaging lens system a compact size.

When an Abbe number of the second lens element is V2, an Abbe number of the fourth lens element is V4, and an Abbe number of the sixth lens element is V6, the following relationship is satisfied: $0.60 < (V2+V4)/V6 < 1.10$. Therefore, the chromatic aberration of the imaging lens system can be corrected.

When a curvature radius of the object-side surface of the sixth lens element is R11, and a curvature radius of the image-side surface of the sixth lens element is R12, the following relationship is satisfied: −1.0<(R11+R12)/(R11−R12)<2.75. Therefore, the principal point can be positioned away from the image plane which is favorable for reducing the total track length so as to maintain a compact size for the imaging lens system. Preferably, −0.50<(R11+R12)/(R11−R12)<2.50.

When an axial distance between the fifth lens element and the sixth lens element is T56, and a central thickness of the sixth lens element is CT6, the following relationship is satisfied: 0.8<T56/CT6<2.5. Therefore, a proper axial distance between the fifth and the sixth lens elements and a proper thickness of the sixth lens element are favorable for assembling and manufacturing.

When a focal length of the imaging lens system is f, and half of a maximal field of view of the imaging lens system is HFOV, the following relationship is satisfied: 5.5 mm<f×tan (HFOV)<10 mm. Therefore, it is favorable for capturing adequate image scene and improving image quality.

According to the imaging lens system of the present disclosure, the lens elements can be made of plastic or glass material. When the lens elements are made of glass material, the distribution of the refractive power of the imaging lens system can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the imaging lens system can be effectively reduced.

According to the imaging lens system of the present disclosure, an aperture stop can be configured as a front stop or a middle stop. A front stop disposed between an imaged object and the first lens element can provide a longer distance between an exit pupil of the system and an image plane and which improves the image-sensing efficiency of the image sensor. A middle stop disposed between the first lens element and the image plane is favorable for enlarging the field of view of the system and thereby provides a wider field of view for the same.

According to the imaging lens system of the present disclosure, the imaging lens system can include at least one stop, such as an aperture stop, a glare stop or a field stop. Said glare stop or said field stop is for eliminating the stray light and thereby improving the image resolution thereof.

According to the imaging lens system of the present disclosure, when the lens element has a convex surface, it indicates that the surface is convex in the paraxial region thereof; and when the surface has a concave surface, it indicates that the surface is concave in the paraxial region thereof. Particularly, the paraxial region thereof refers to the region of the surface where light rays travel close to an optical axis and an off-axis region thereof refers to the region of the surface where light rays travel away from the optical axis.

According to the imaging lens system of the present disclosure, the imaging lens system is featured with good correction ability and high image quality, and can be applied to 3D (three-dimensional) image capturing applications, in products such as digital cameras, mobile devices and tablets.

According to the present disclosure, an image capturing device is provided. The image capturing device includes the imaging lens system according to the aforementioned imaging lens system of the present disclosure, and an image sensor located on an image plane side of said imaging lens system.

According to the above description of the present disclosure, the following 1st-8th specific embodiments are provided for further explanation.

1st Embodiment

FIG. 1 is a schematic view of an imaging lens system according to the 1st embodiment of the present disclosure.

Figure 2:
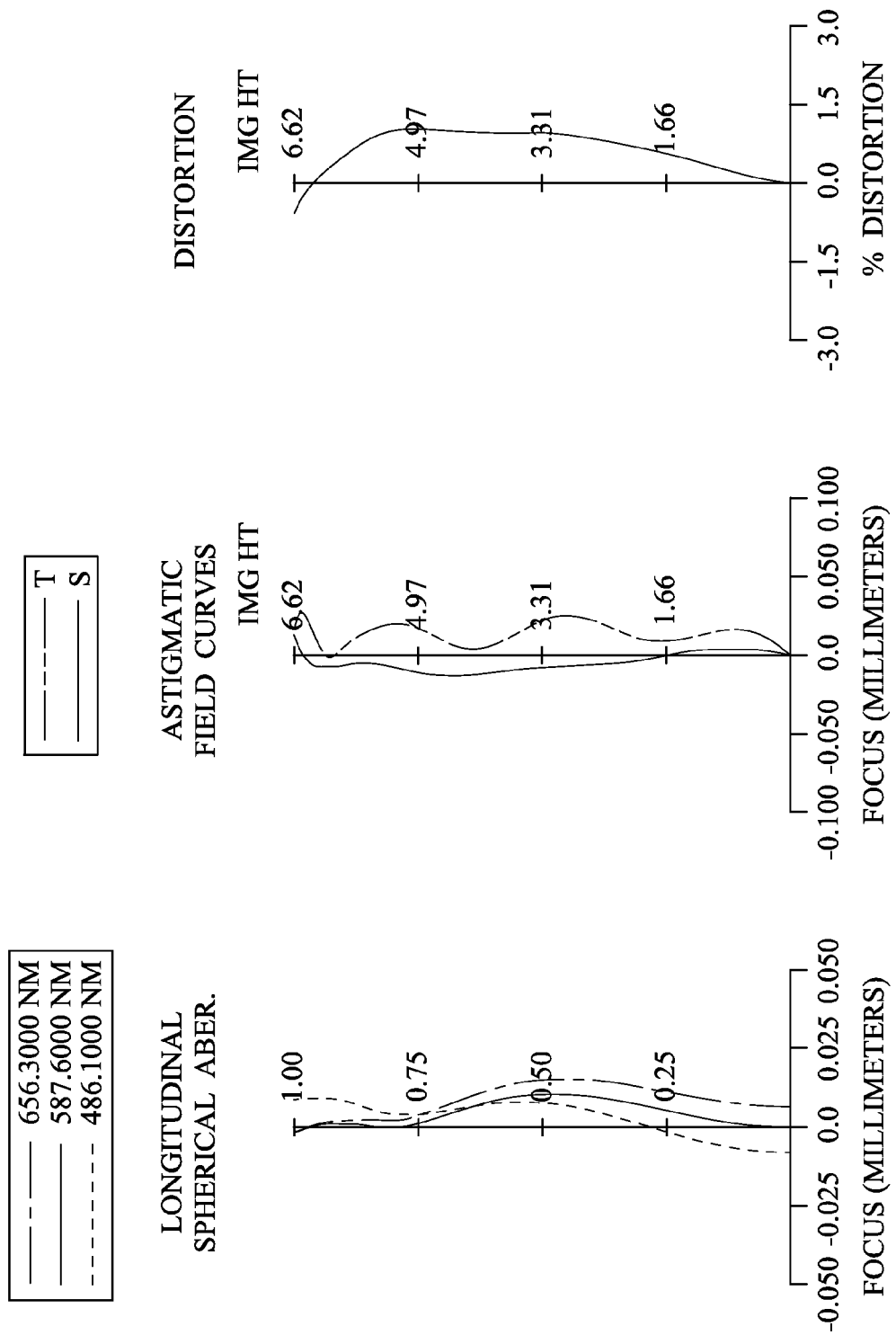
FIG. 2 shows spherical aberration curves, astigmatic field curves and a distortion curve of the imaging lens system according to the 1st embodiment.

FIG. 2 shows spherical aberration curves, astigmatic field curves and a distortion curve of the imaging lens system according to the 1st embodiment. In FIG. 1, the imaging lens system includes six non-cemented lens elements with refractive power, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170 and an image sensor 190, wherein the imaging lens system has a total of six lens elements with refractive power.

The first lens element 110 with positive refractive power has a convex object-side surface 111 and a concave image-side surface 112. The first lens element 110 is made of plastic material, and has the object-side surface 111 and the image-side surface 112 being both aspheric.

The second lens element 120 with negative refractive power has a convex object-side surface 121 and a concave image-side surface 122. The second lens element 120 is made of plastic material, and has the object-side surface 121 and the image-side surface 122 being both aspheric.

The third lens element 130 with positive refractive power has a convex object-side surface 131 and a convex image-side surface 132. The third lens element 130 is made of plastic material, and has the object-side surface 131 and the image-side surface 132 being both aspheric.

The fourth lens element 140 with negative refractive power has a concave object-side surface 141 and a convex image-side surface 142. The fourth lens element 140 is made of plastic material, and has the object-side surface 141 and the image-side surface 142 being both aspheric.

The fifth lens element 150 with positive refractive power has a convex object-side surface 151 in a paraxial region thereof and a concave image-side surface 152, wherein the object-side surface 151 of the fifth lens element 150 has a concave shape in an off-axis region thereof. The fifth lens element 150 is made of plastic material, and has the object-side surface 151 and the image-side surface 152 being both aspheric.

The sixth lens element 160 with negative refractive power has a convex object-side surface 161 and a concave image-side surface 162 in a paraxial region thereof, wherein the image-side surface 162 of the sixth lens element 160 has a convex shape in an off-axis region thereof. The sixth lens element 160 is made of plastic material, and has the object-side surface 161 and the image-side surface 162 being both aspheric.

The IR-cut filter 180 is made of glass material and located between the sixth lens element 160 and the image plane 170, and will not affect the focal length of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the imaging lens system according to the 1st embodiment, when a focal length of the imaging lens system is f, an f-number of the imaging lens system is Fno, and half of a maximal field of view of the imaging lens system is HFOV, these parameters have the following values: f=7.46 mm; Fno=2.40; and HFOV=41.8 degrees.

In the imaging lens system according to the 1st embodiment, when an Abbe number of the second lens element 120 is V2, an Abbe number of the fourth lens element 140 is V4, and an Abbe number of the sixth lens element 160 is V6, the following relationship is satisfied:

$(V2+V4)/V6=0.83.$

In the imaging lens system according to the 1st embodiment, when an axial distance between the first lens element 110 and the second lens element 120 is T12, a central thickness of the first lens element 110 is CT1, and a central thickness of the second lens element 120 is CT2, the following relationships are satisfied:

$T12/CT1=1.31;$ and $T12/CT2=1.67.$

In the imaging lens system according to the 1st embodiment, when an axial distance between the fifth lens element 150 and the sixth lens element 160 is T56, and a central thickness of the sixth lens element 160 is CT6, the following relationship is satisfied:

$T56/CT6=1.13.$

In the imaging lens system according to the 1st embodiment, when a curvature radius of the object-side surface 151 of the fifth lens element 150 is R9, and a curvature radius of the image-side surface 152 of the fifth lens element 150 is R10, the following relationship is satisfied:

$|R9/R10|=0.09.$

In the imaging lens system according to the 1st embodiment, when a curvature radius of the object-side surface 161 of the sixth lens element 160 is R11, and a curvature radius of the image-side surface 162 of the sixth lens element 160 is R12, the following relationship is satisfied:

$(R11+R12)/(R11-R12)=2.20.$

In the imaging lens system according to the 1st embodiment, when a focal length of the first lens element 110 is f1, and a focal length of the third lens element 130 is f3, the following relationship is satisfied:

$f3/f1=0.58.$

In the imaging lens system according to the 1st embodiment, when the focal length of the imaging lens system is f, and half of the maximal field of view of the imaging lens system is HFOV, the following relationship is satisfied:

$f \times \tan(HFOV)=6.67$ mm.

The detailed optical data of the 1st embodiment are shown in Table 1 and the aspheric surface data are shown in Table 2 below.

TABLE 1

1st Embodiment
f = 7.46 mm, Fno = 2.40, HFOV = 41.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.224 | | | | |
| 2 | Lens 1 | 4.942 | ASP | 0.740 | Plastic | 1.544 | 55.9 | 12.54 |
| 3 | | 16.983 | ASP | 0.969 | | | | |
| 4 | Lens 2 | 7.400 | ASP | 0.580 | Plastic | 1.640 | 23.3 | −19.68 |
| 5 | | 4.519 | ASP | 0.402 | | | | |
| 6 | Lens 3 | 15.632 | ASP | 1.569 | Plastic | 1.544 | 55.9 | 7.28 |
| 7 | | −5.115 | ASP | 0.900 | | | | |
| 8 | Lens 4 | −1.439 | ASP | 0.737 | Plastic | 1.640 | 23.3 | −8.16 |
| 9 | | −2.383 | ASP | 0.080 | | | | |
| 10 | Lens 5 | 3.242 | ASP | 1.354 | Plastic | 1.544 | 55.9 | 6.44 |
| 11 | | 36.649 | ASP | 1.017 | | | | |
| 12 | Lens 6 | 7.597 | ASP | 0.901 | Plastic | 1.544 | 55.9 | −8.95 |
| 13 | | 2.843 | ASP | 1.000 | | | | |
| 14 | IR-cut filter | Plano | | 0.300 | Glass | 1.517 | 64.2 | — |
| 15 | | Plano | | 0.623 | | | | |
| 16 | Image | Plano | | — | | | | |

Note:
Reference wavelength is 587.6 nm (d-line).

TABLE 2

Aspheric Coefficients

| | Surface # | | | | |
|---|---|---|---|---|---|
| | 2 | 3 | 4 | 5 | 6 | 7 |
| k = | −9.7110E−01 | −1.0000E+00 | −2.0634E+01 | −1.1173E+00 | −1.0000E+00 | 6.3510E−01 |
| A4 = | −1.1527E−03 | −5.8017E−03 | −1.0297E−02 | −1.5169E−02 | −7.9494E−03 | −9.0250E−03 |
| A6 = | −4.3736E−04 | −3.4409E−04 | 2.4551E−04 | 2.4859E−03 | 1.5997E−03 | 2.9227E−03 |
| A8 = | −1.4543E−05 | −3.5399E−04 | −4.0418E−04 | −5.4280E−04 | −5.3404E−04 | −1.1486E−03 |
| A10 = | −4.7264E−05 | 8.4473E−05 | 6.2887E−05 | 6.9150E−05 | 1.7480E−04 | 2.9322E−04 |
| A12 = | | −1.8098E−05 | −3.4768E−06 | −3.2370E−06 | −3.7268E−05 | −3.7305E−05 |

TABLE 2-continued

Aspheric Coefficients

|  | | | | | |
|---|---|---|---|---|---|
| A14 = | | 1.9867E−07 | −2.0476E−08 | 4.0311E−06 | 2.2022E−06 |
| A16 = | | | | −1.6968E−07 | −4.5518E−08 |

| | Surface # | | | | | |
|---|---|---|---|---|---|---|
| | 8 | 9 | 10 | 11 | 12 | 13 |
| k = | −2.0827E+00 | −2.3134E+00 | −5.6119E+00 | 1.4381E+01 | −2.8376E+01 | −5.4380E+00 |
| A4 = | 1.1923E−02 | 6.7194E−03 | −1.5423E−03 | 2.0664E−03 | −1.7533E−02 | −7.1835E−03 |
| A6 = | −6.2607E−03 | −3.5571E−03 | 5.1460E−04 | 3.7121E−04 | 2.6061E−03 | 8.0576E−04 |
| A8 = | 1.6309E−03 | 8.7114E−04 | −6.9384E−05 | −8.0423E−05 | −2.7989E−04 | −7.1096E−05 |
| A10 = | −1.8418E−04 | −1.1076E−04 | 3.8462E−06 | 4.8477E−06 | 1.8614E−05 | 3.9886E−06 |
| A12 = | 8.8328E−06 | 7.9452E−06 | −1.2632E−07 | −1.2611E−07 | −6.9640E−07 | −1.2999E−07 |
| A14 = | −3.2751E−08 | −2.8877E−07 | 2.3633E−09 | 1.2262E−09 | 1.3549E−08 | 2.2237E−09 |
| A16 = | −8.0881E−09 | 3.8230E−09 | −1.6062E−11 | | −1.0737E−10 | −1.5400E−11 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
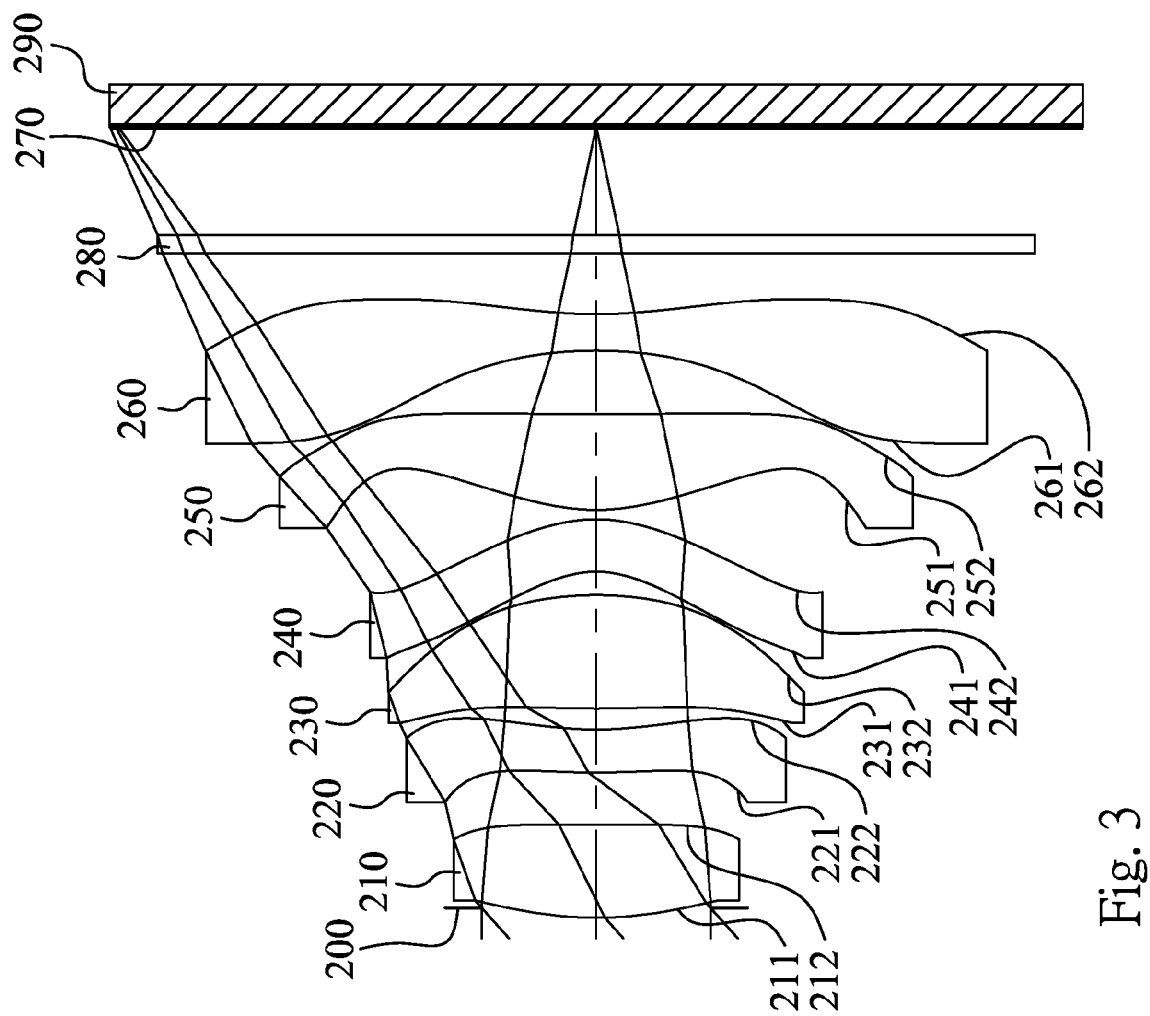
FIG. 3 is a schematic view of an imaging lens system according to the 2nd embodiment of the present disclosure.
Figure 4:
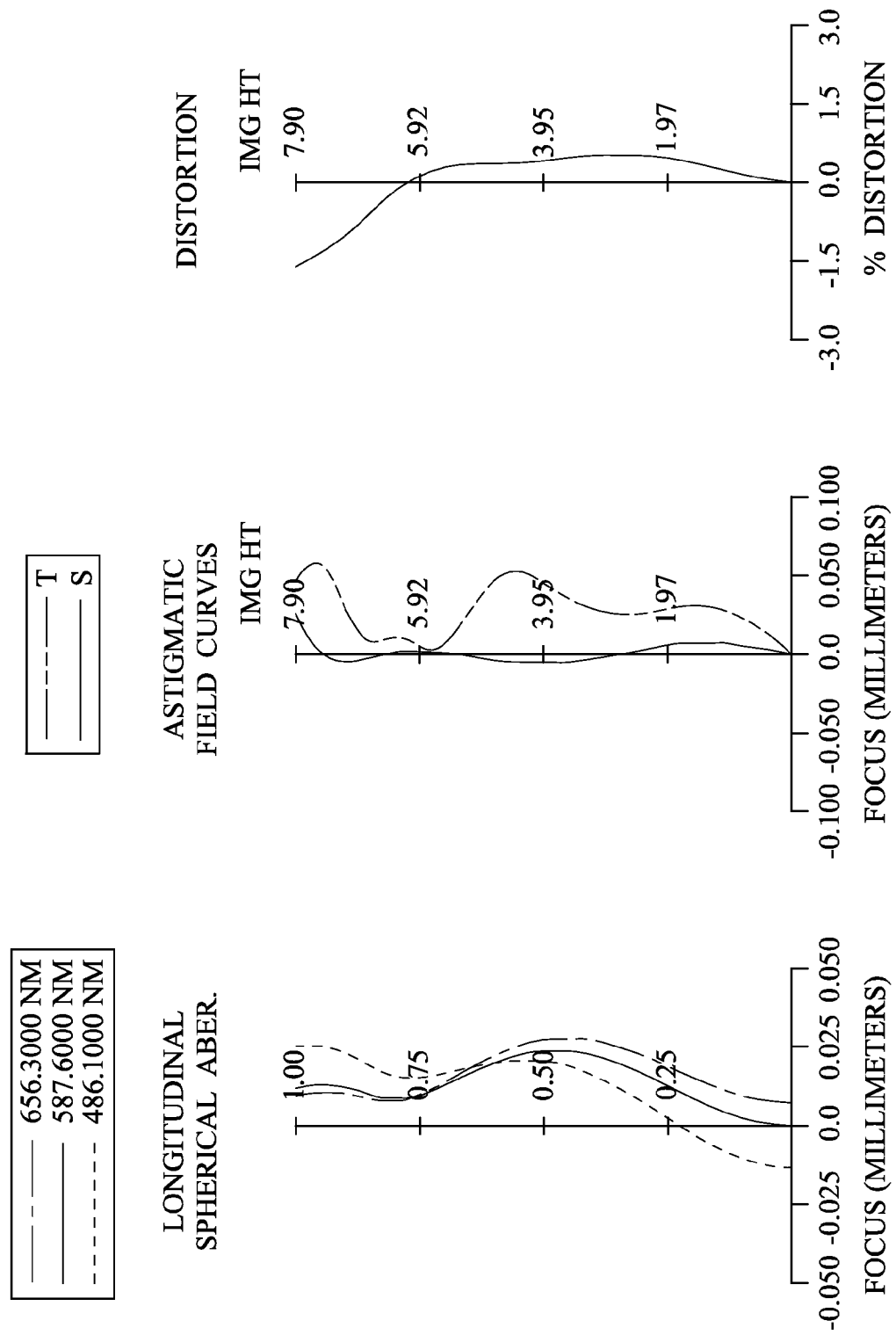
FIG. 4 shows spherical aberration curves, astigmatic field curves and a distortion curve of the imaging lens system according to the 2nd embodiment.

FIG. 3 is a schematic view of an imaging lens system according to the 2nd embodiment of the present disclosure. FIG. 4 shows spherical aberration curves, astigmatic field curves and a distortion curve of the imaging lens system according to the 2nd embodiment. In FIG. 3, the imaging lens system includes six non-cemented lens elements with refractive power, in order from an object side to an image side, an aperture stop 200, a first lens element 210, a second lens element 220, a third lens element 230, a fourth lens element 240, a fifth lens element 250, a sixth lens element 260, an IR-cut filter 280, an image plane 270 and an image sensor 290, wherein the imaging lens system has a total of six lens elements with refractive power.

The first lens element 210 with positive refractive power has a convex object-side surface 211 and a concave image-side surface 212. The first lens element 210 is made of plastic material, and has the object-side surface 211 and the image-side surface 212 being both aspheric.

The second lens element 220 with negative refractive power has a convex object-side surface 221 and a concave image-side surface 222. The second lens element 220 is made of plastic material, and has the object-side surface 221 and the image-side surface 222 being both aspheric.

The third lens element 230 with positive refractive power has a convex object-side surface 231 and a convex image-side surface 232. The third lens element 230 is made of plastic material, and has the object-side surface 231 and the image-side surface 232 being both aspheric.

The fourth lens element 240 with negative refractive power has a concave object-side surface 241 and a convex image-side surface 242. The fourth lens element 240 is made of plastic material, and has the object-side surface 241 and the image-side surface 242 being both aspheric.

The fifth lens element 250 with positive refractive power has a convex object-side surface 251 in a paraxial region thereof and a concave image-side surface 252, wherein the object-side surface 251 of the fifth lens element 250 has a concave shape in an off-axis region thereof. The fifth lens element 250 is made of plastic material, and has the object-side surface 251 and the image-side surface 252 being both aspheric.

The sixth lens element 260 with negative refractive power has a concave object-side surface 261 and a concave image-side surface 262 in a paraxial region thereof, wherein the image-side surface 262 of the sixth lens element 260 has a convex shape in an off-axis region thereof. The sixth lens element 260 is made of plastic material, and has the object-side surface 261 and the image-side surface 262 being both aspheric.

The IR-cut filter 280 is made of glass material and located between the sixth lens element 260 and the image plane 270, and will not affect the focal length of the imaging lens system.

The detailed optical data of the 2nd embodiment are shown in Table 3 and the aspheric surface data are shown in Table 4 below.

TABLE 3

2nd Embodiment
f = 9.02 mm, Fno = 2.40, HFOV = 41.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.160 | | | | |
| 2 | Lens 1 | 6.297 | ASP | 1.529 | Plastic | 1.535 | 55.7 | 12.84 |
| 3 | | 69.061 | ASP | 0.857 | | | | |
| 4 | Lens 2 | 11.905 | ASP | 0.709 | Plastic | 1.640 | 23.3 | −19.88 |
| 5 | | 6.006 | ASP | 0.343 | | | | |
| 6 | Lens 3 | 18.735 | ASP | 1.866 | Plastic | 1.535 | 55.7 | 8.62 |
| 7 | | −5.903 | ASP | 0.383 | | | | |

TABLE 3-continued

2nd Embodiment
f = 9.02 mm, Fno = 2.40, HFOV = 41.7 deg.

| Surface # | | Curvature Radius | | Thickness | Material | Index | Abbe # | Focal Length |
|---|---|---|---|---|---|---|---|---|
| 8 | Lens 4 | −1.693 | ASP | 0.861 | Plastic | 1.640 | 23.3 | −11.27 |
| 9 | | −2.652 | ASP | 0.156 | | | | |
| 10 | Lens 5 | 3.407 | ASP | 1.578 | Plastic | 1.535 | 55.7 | 6.46 |
| 11 | | 200.000 | ASP | 1.039 | | | | |
| 12 | Lens 6 | −7.146 | ASP | 0.600 | Plastic | 1.544 | 55.9 | −6.89 |
| 13 | | 8.120 | ASP | 1.000 | | | | |
| 14 | IR-cut filter | Plano | | 0.300 | Glass | 1.517 | 64.2 | — |
| 15 | | Plano | | 1.785 | | | | |
| 16 | Image | Plano | | — | | | | |

Note:
Reference wavelength is 587.6 nm (d-line).

TABLE 4

Aspheric Coefficients

| | | | Surface # | | | |
|---|---|---|---|---|---|---|
| | 2 | 3 | 4 | 5 | 6 | 7 |
| k = | −1.1854E+00 | −1.0000E+00 | −6.4639E+01 | −1.7335E+00 | −1.0000E+00 | 1.0872E+00 |
| A4 = | −7.7849E−04 | −5.7731E−03 | −8.8814E−03 | −1.1694E−02 | −8.2526E−03 | −7.3654E−03 |
| A6 = | −1.3914E−04 | −1.8117E−04 | −2.0522E−04 | 1.4262E−03 | 4.4887E−04 | 1.0615E−03 |
| A8 = | −8.4535E−06 | −1.2525E−04 | −2.3901E−04 | −2.6754E−04 | −1.4071E−05 | −1.3013E−04 |
| A10 = | −7.5571E−06 | 1.6625E−05 | 1.8917E−05 | 2.5394E−05 | −3.3177E−06 | 7.5081E−06 |
| A12 = | | −1.7312E−06 | −1.7179E−06 | −1.4741E−06 | 6.2565E−07 | 1.7665E−10 |
| A14 = | | | −1.3046E−08 | 3.7050E−08 | −2.6559E−08 | −7.5100E−09 |

| | | | Surface # | | | |
|---|---|---|---|---|---|---|
| | 8 | 9 | 10 | 11 | 12 | 13 |
| k = | −2.8785E+00 | −3.2186E+00 | −5.8168E+00 | −9.0000E+01 | −1.6035E−01 | −1.8602E+00 |
| A4 = | 1.6642E−03 | 4.5159E−04 | −2.6193E−03 | −1.2835E−03 | −2.3471E−03 | −5.3208E−03 |
| A6 = | 2.2490E−04 | −5.5856E−06 | 3.7463E−04 | 3.0192E−04 | −1.0833E−04 | 1.8341E−04 |
| A8 = | −9.0355E−06 | 5.4486E−06 | −4.7510E−05 | −1.8506E−05 | 3.7673E−05 | 3.5329E−06 |
| A10 = | 1.1187E−06 | 8.8240E−09 | 2.7059E−06 | −1.9774E−06 | −2.1556E−06 | −5.3025E−07 |
| A12 = | −1.5240E−07 | 1.6782E−08 | −2.0676E−07 | 2.1039E−07 | 5.7706E−08 | 1.6657E−08 |
| A14 = | 2.3510E−09 | −1.4565E−10 | 9.4289E−09 | −6.5658E−09 | −7.8199E−10 | −2.1701E−10 |
| A16 = | | | −1.4259E−10 | 6.8254E−11 | 4.3750E−12 | 1.0074E−12 |

In the imaging lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| 2nd Embodiment | | | |
|---|---|---|---|
| f [mm] | 9.02 | T56/CT6 | 1.73 |
| Fno | 2.40 | |R9/R10| | 0.02 |
| HFOV [deg.] | 41.7 | (R11 + R12)/(R11 − R12) | −0.06 |
| (V2 + V4)/V6 | 0.83 | f3/f1 | 0.67 |
| T12/CT1 | 0.56 | f × tan(HFOV) [mm] | 8.04 |
| T12/CT2 | 1.21 | | |

3rd Embodiment

Figure 5:
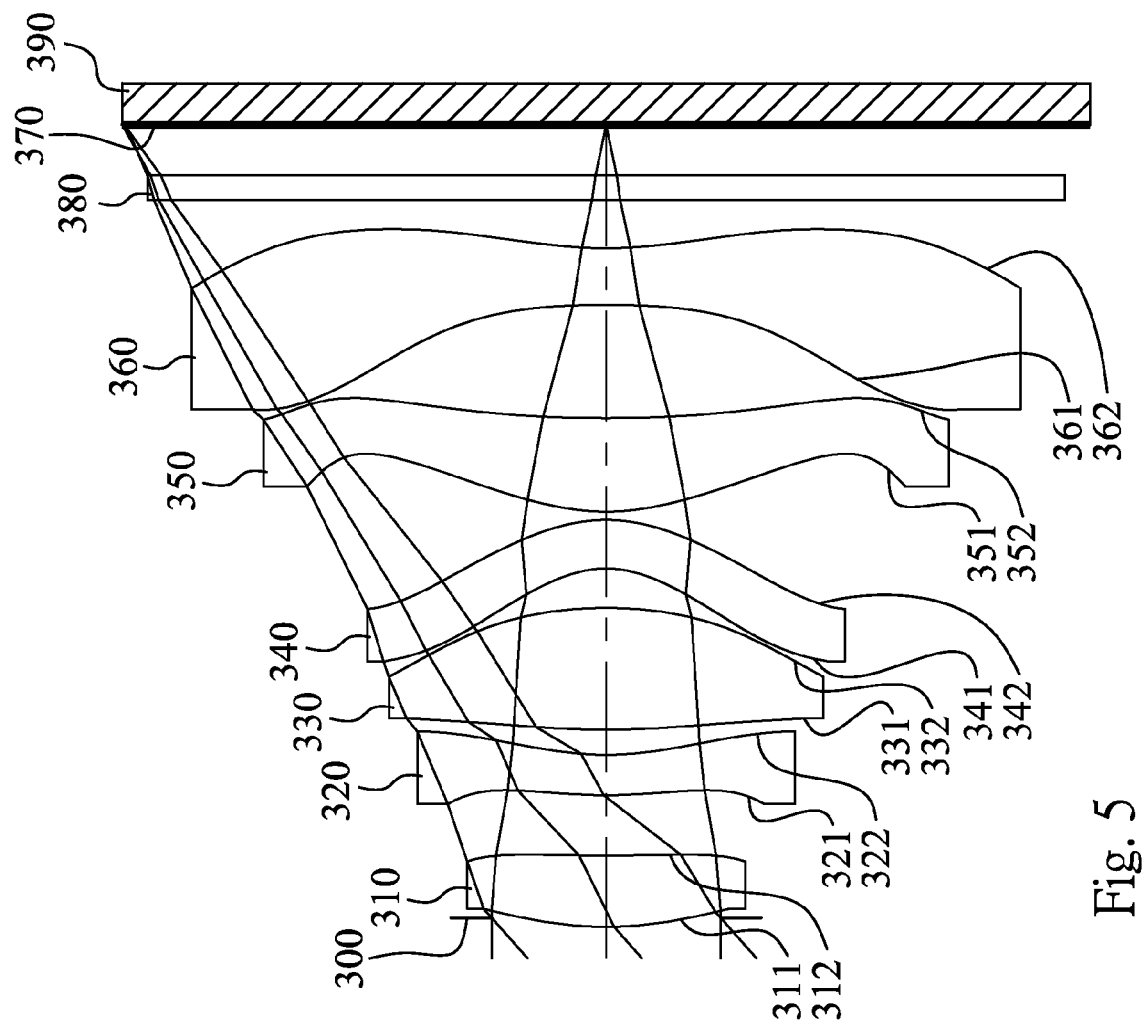
FIG. 5 is a schematic view of an imaging lens system according to the 3rd embodiment of the present disclosure.
Figure 6:
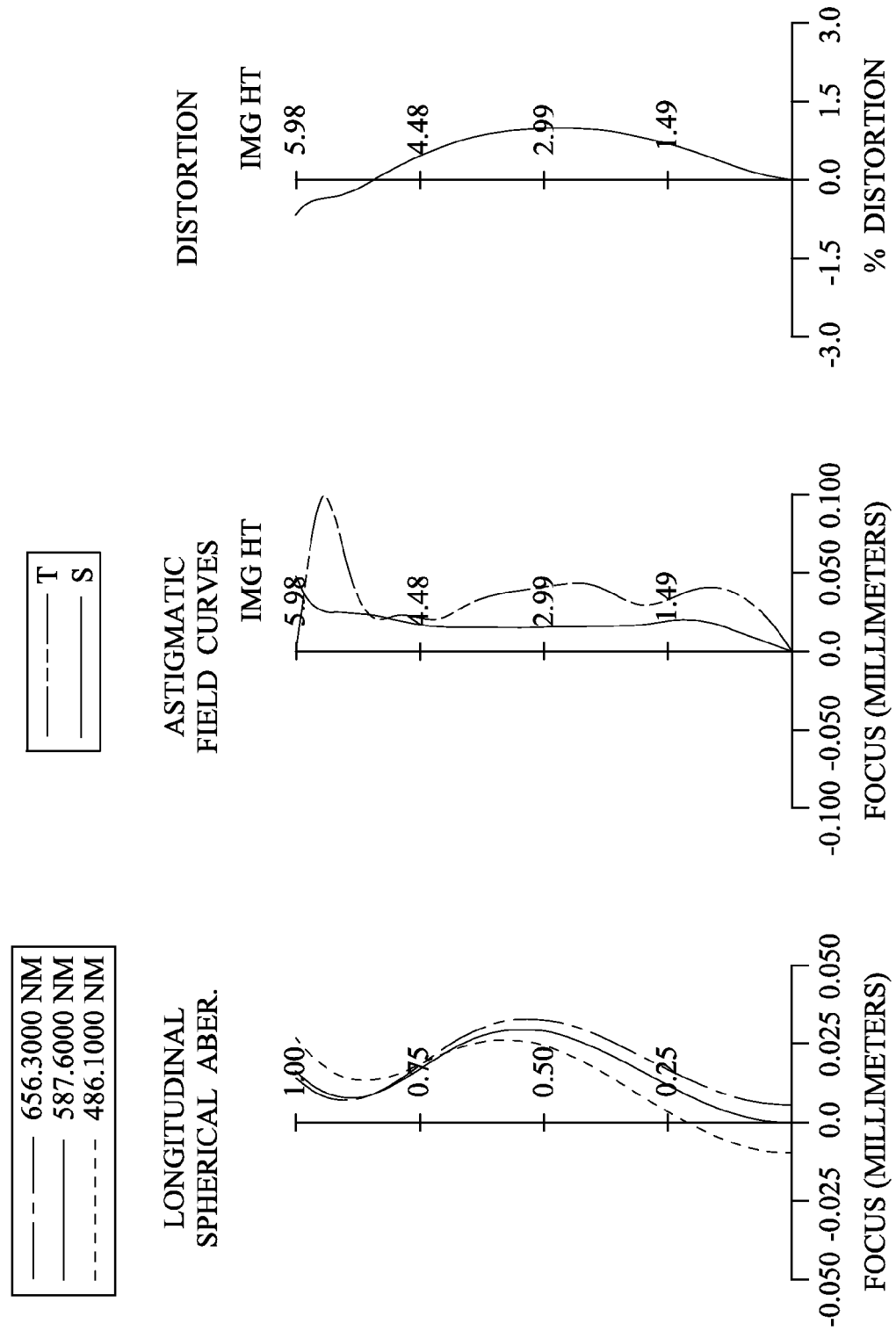
FIG. 6 shows spherical aberration curves, astigmatic field curves and a distortion curve of the imaging lens system according to the 3rd embodiment.

FIG. 5 is a schematic view of an imaging lens system according to the 3rd embodiment of the present disclosure. FIG. 6 shows spherical aberration curves, astigmatic field curves and a distortion curve of the imaging lens system according to the 3rd embodiment. In FIG. 5, the imaging lens system includes six non-cemented lens elements with refractive power, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370 and an image sensor 390, wherein the imaging lens system has a total of six lens elements with refractive power.

The first lens element 310 with positive refractive power has a convex object-side surface 311 and a concave image-side surface 312. The first lens element 310 is made of plastic material, and has the object-side surface 311 and the image-side surface 312 being both aspheric.

The second lens element 320 with negative refractive power has a convex object-side surface 321 and a concave image-side surface 322. The second lens element 320 is made of plastic material, and has the object-side surface 321 and the image-side surface 322 being both aspheric.

The third lens element 330 with positive refractive power has a convex object-side surface 331 and a convex image-side surface 332. The third lens element 330 is made of plastic material, and has the object-side surface 331 and the image-side surface 332 being both aspheric.

The fourth lens element 340 with negative refractive power has a concave object-side surface 341 and a convex image-side surface 342. The fourth lens element 340 is made of plastic material, and has the object-side surface 341 and the image-side surface 342 being both aspheric.

The fifth lens element 350 with positive refractive power has a convex object-side surface 351 in a paraxial region thereof and a concave image-side surface 352, wherein the object-side surface 351 of the fifth lens element 350 has a concave shape in an off-axis region thereof. The fifth lens element 350 is made of plastic material, and has the object-side surface 351 and the image-side surface 352 being both aspheric.

The sixth lens element 360 with negative refractive power has a concave object-side surface 361 and a concave image-side surface 362 in a paraxial region thereof, wherein the image-side surface 362 of the sixth lens element 360 has a convex shape in an off-axis region thereof. The sixth lens element 360 is made of plastic material, and has the object-side surface 361 and the image-side surface 362 being both aspheric.

The IR-cut filter 380 is made of glass material and located between the sixth lens element 360 and the image plane 370, and will not affect the focal length of the imaging lens system.

The detailed optical data of the 3rd embodiment are shown in Table 5 and the aspheric surface data are shown in Table 6 below.

TABLE 5

3rd Embodiment
f = 6.79 mm, Fno = 2.40, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.112 | | | | |
| 2 | Lens 1 | 4.643 | ASP | 0.881 | Plastic | 1.535 | 55.7 | 10.96 |
| 3 | | 20.851 | ASP | 0.748 | | | | |
| 4 | Lens 2 | 6.404 | ASP | 0.500 | Plastic | 1.640 | 23.3 | −16.20 |
| 5 | | 3.838 | ASP | 0.308 | | | | |
| 6 | Lens 3 | 9.136 | ASP | 1.508 | Plastic | 1.535 | 55.7 | 6.68 |
| 7 | | −5.536 | ASP | 0.489 | | | | |
| 8 | Lens 4 | −1.289 | ASP | 0.600 | Plastic | 1.640 | 23.3 | −8.24 |
| 9 | | −2.017 | ASP | 0.102 | | | | |
| 10 | Lens 5 | 2.773 | ASP | 1.158 | Plastic | 1.535 | 55.7 | 5.82 |
| 11 | | 21.523 | ASP | 1.401 | | | | |
| 12 | Lens 6 | −11.139 | ASP | 0.700 | Plastic | 1.535 | 55.7 | −6.67 |
| 13 | | 5.371 | ASP | 0.600 | | | | |
| 14 | IR-cut filter | Plano | | 0.300 | Glass | 1.517 | 64.2 | — |
| 15 | | Plano | | 0.626 | | | | |
| 16 | Image | Plano | | — | | | | |

Note:
Reference wavelength is 587.6 nm (d-line).

TABLE 6

Aspheric Coefficients

| | Surface # | | | | | |
|---|---|---|---|---|---|---|
| | 2 | 3 | 4 | 5 | 6 | 7 |
| k = | −9.2497E−01 | −1.0000E+00 | −2.1071E+01 | −6.5962E−01 | −1.0000E+00 | 1.1387E+00 |
| A4 = | −1.6473E−03 | −1.0331E−02 | −1.7107E−02 | −2.6487E−02 | −1.2410E−02 | −1.5864E−02 |
| A6 = | −1.0455E−03 | −1.5968E−04 | 1.5329E−03 | 6.9089E−03 | 3.2098E−03 | 5.0794E−03 |
| A8 = | 1.1566E−04 | −1.1870E−03 | −1.6335E−03 | −2.1732E−03 | −5.6750E−04 | −9.9010E−04 |
| A10 = | −1.1882E−04 | 3.4919E−04 | 3.0187E−04 | 3.8615E−04 | −1.0625E−05 | 1.0397E−04 |
| A12 = | | −5.7891E−05 | −4.2788E−05 | −3.2496E−05 | 1.7175E−05 | −2.0793E−06 |
| A14 = | | | 5.8454E−06 | 9.4448E−07 | −1.4821E−06 | −2.2300E−07 |

| | Surface # | | | | | |
|---|---|---|---|---|---|---|
| | 8 | 9 | 10 | 11 | 12 | 13 |
| k = | −2.0984E+00 | −2.4205E+00 | −8.1586E+00 | 2.0000E+01 | −2.7782E−01 | −2.4506E+00 |
| A4 = | 9.4391E−03 | −1.7330E−03 | 8.5133E−03 | 7.2623E−03 | −9.4415E−03 | −1.2880E−02 |
| A6 = | 4.8452E−04 | 3.8375E−03 | −3.2981E−03 | −2.3281E−03 | −5.2099E−04 | 1.1092E−03 |
| A8 = | −8.6643E−04 | −1.6862E−03 | 6.8543E−04 | 3.6266E−04 | 2.5189E−04 | −6.0443E−05 |
| A10 = | 3.6359E−04 | 3.9457E−04 | −9.5687E−05 | −3.1853E−05 | −2.5408E−05 | 2.0352E−06 |
| A12 = | −6.1184E−05 | −4.8210E−05 | 8.2205E−06 | 1.3843E−06 | 1.2955E−06 | −5.5291E−08 |
| A14 = | 4.5709E−06 | 2.9902E−06 | −4.1168E−07 | −2.5506E−08 | −3.4140E−08 | 1.3539E−09 |
| A16 = | −1.2921E−07 | −7.4476E−08 | 8.9562E−09 | 1.1513E−10 | 3.6610E−10 | −1.6975E−11 |

In the imaging lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| 3rd Embodiment | | | |
|---|---|---|---|
| f [mm] | 6.79 | T56/CT6 | 2.00 |
| Fno | 2.40 | \|R9/R10\| | 0.13 |
| HFOV [deg.] | 41.5 | (R11 + R12)/(R11 − R12) | 0.35 |
| (V2 + V4)/V6 | 0.84 | f3/f1 | 0.61 |
| T12/CT1 | 0.85 | f × tan(HFOV) [mm] | 6.01 |
| T12/CT2 | 1.50 | | |

4th Embodiment

Figure 7:
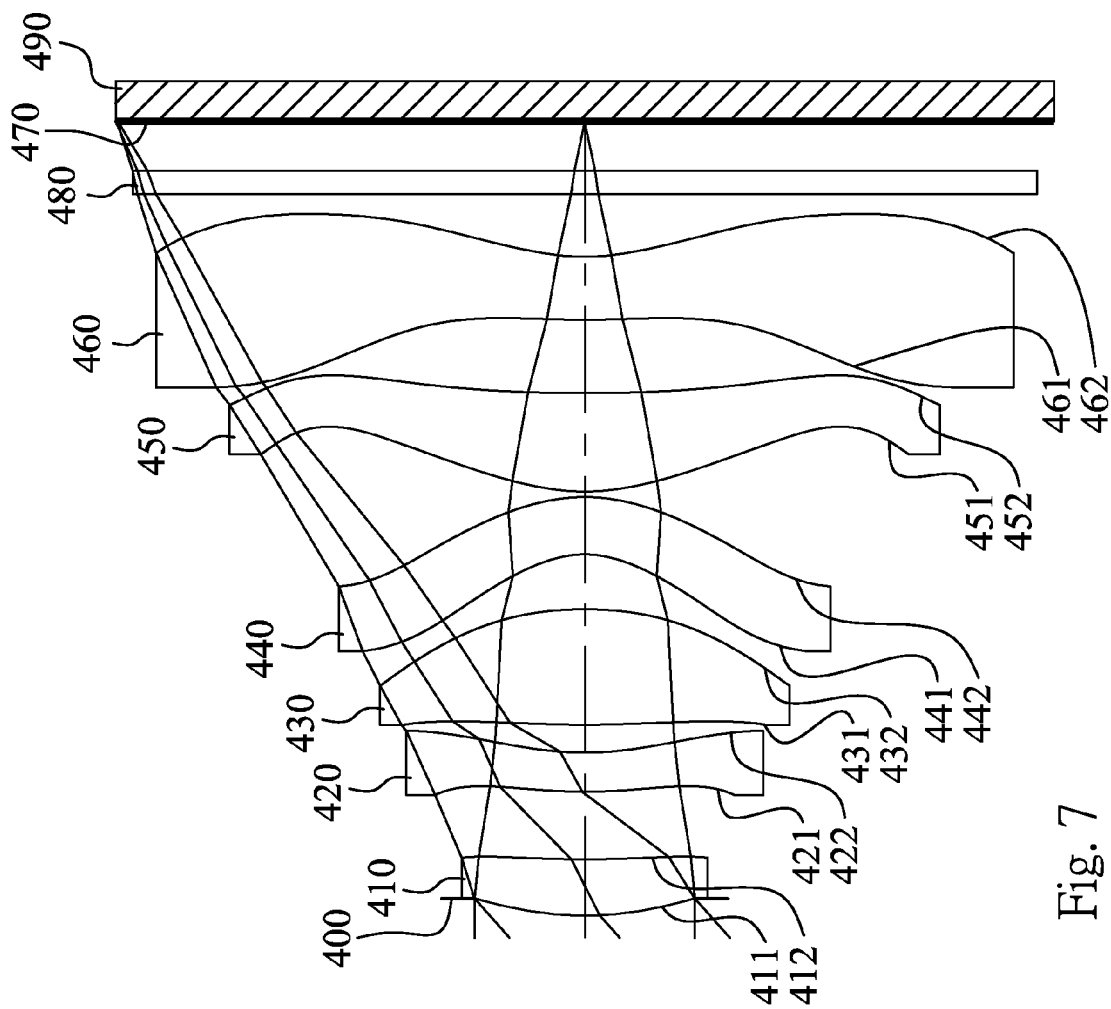
FIG. 7 is a schematic view of an imaging lens system according to the 4th embodiment of the present disclosure.
Figure 8:
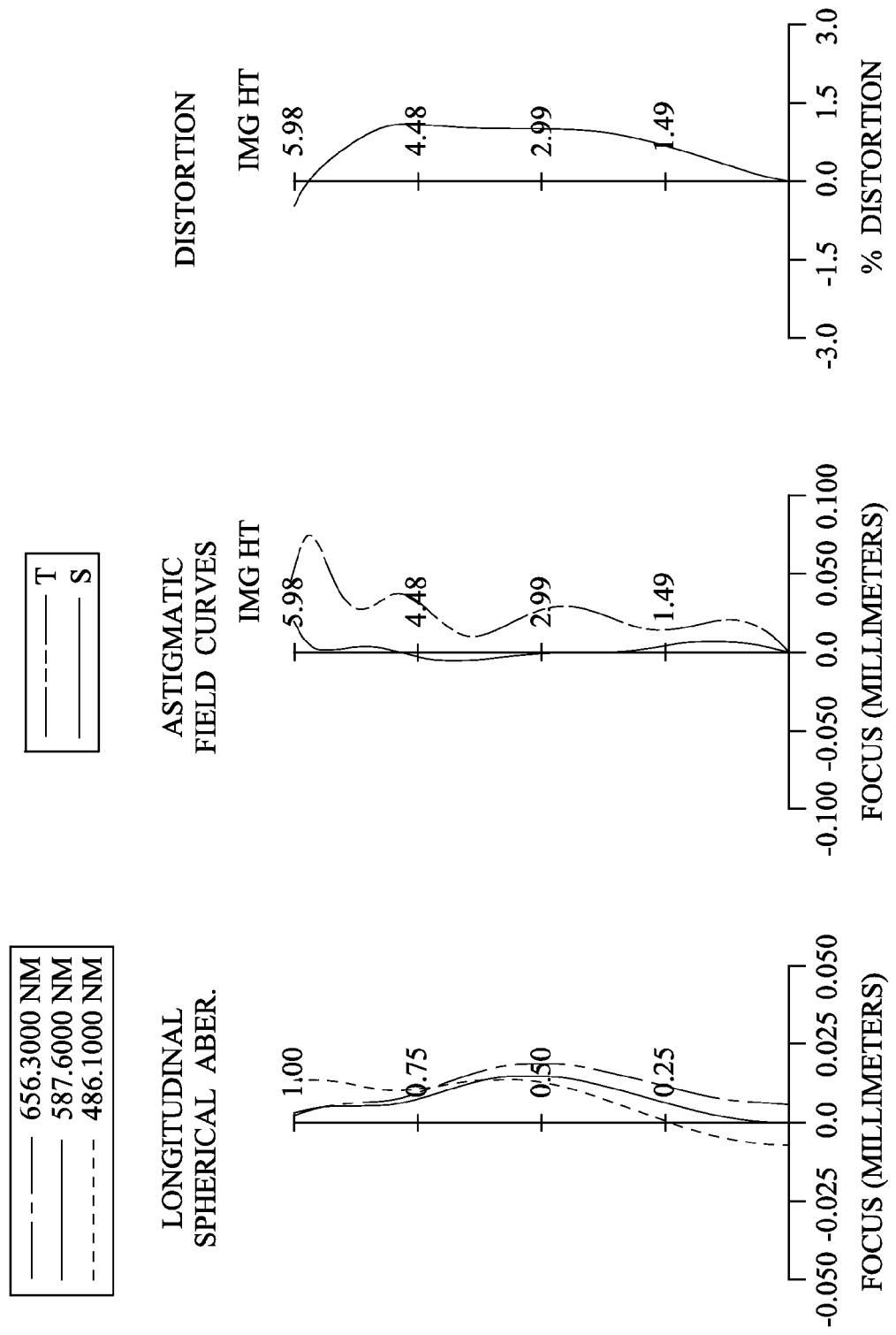
FIG. 8 shows spherical aberration curves, astigmatic field curves and a distortion curve of the imaging lens system according to the 4th embodiment.

FIG. 7 is a schematic view of an imaging lens system according to the 4th embodiment of the present disclosure. FIG. 8 shows spherical aberration curves, astigmatic field curves and a distortion curve of the imaging lens system according to the 4th embodiment. In FIG. 7, the imaging lens system includes six non-cemented lens elements with refractive power, in order from an object side to an image side, an aperture stop 400, a first lens element 410, a second lens element 420, a third lens element 430, a fourth lens element 440, a fifth lens element 450, a sixth lens element 460, an IR-cut filter 480, an image plane 470 and an image sensor 490, wherein the imaging lens system has a total of six lens elements with refractive power.

The first lens element 410 with positive refractive power has a convex object-side surface 411 and a concave image-side surface 412. The first lens element 410 is made of plastic material, and has the object-side surface 411 and the image-side surface 412 being both aspheric.

The second lens element 420 with negative refractive power has a convex object-side surface 421 and a concave image-side surface 422. The second lens element 420 is made of plastic material, and has the object-side surface 421 and the image-side surface 422 being both aspheric.

The third lens element 430 with positive refractive power has a convex object-side surface 431 and a convex image-side surface 432. The third lens element 430 is made of plastic material, and has the object-side surface 431 and the image-side surface 432 being both aspheric.

The fourth lens element 440 with negative refractive power has a concave object-side surface 441 and a convex image-side surface 442. The fourth lens element 440 is made of plastic material, and has the object-side surface 441 and the image-side surface 442 being both aspheric.

The fifth lens element 450 with positive refractive power has a convex object-side surface 451 in a paraxial region thereof and a concave image-side surface 452, wherein the object-side surface 451 of the fifth lens element 450 has a concave shape in an off-axis region thereof. The fifth lens element 450 is made of plastic material, and has the object-side surface 451 and the image-side surface 452 being both aspheric.

The sixth lens element 460 with negative refractive power has a convex object-side surface 461 and a concave image-side surface 462 in a paraxial region thereof, wherein the image-side surface 462 of the sixth lens element 460 has a convex shape in an off-axis region thereof. The sixth lens element 460 is made of plastic material, and has the object-side surface 461 and the image-side surface 462 being both aspheric.

The IR-cut filter 480 is made of glass material and located between the sixth lens element 460 and the image plane 470, and will not affect the focal length of the imaging lens system.

The detailed optical data of the 4th embodiment are shown in Table 7 and the aspheric surface data are shown in Table 8 below.

TABLE 7

4th Embodiment
f = 6.74 mm, Fno = 2.40, HFOV = 41.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.218 | | | | |
| 2 | Lens 1 | 4.275 | ASP | 0.717 | Plastic | 1.544 | 55.9 | 11.27 |
| 3 | | 13.278 | ASP | 0.862 | | | | |
| 4 | Lens 2 | 6.180 | ASP | 0.500 | Plastic | 1.640 | 23.3 | −18.73 |
| 5 | | 3.949 | ASP | 0.356 | | | | |
| 6 | Lens 3 | 13.824 | ASP | 1.474 | Plastic | 1.544 | 55.9 | 6.41 |
| 7 | | −4.492 | ASP | 0.700 | | | | |
| 8 | Lens 4 | −1.319 | ASP | 0.732 | Plastic | 1.640 | 23.3 | −7.10 |
| 9 | | −2.261 | ASP | 0.070 | | | | |
| 10 | Lens 5 | 2.804 | ASP | 1.256 | Plastic | 1.544 | 55.9 | 5.68 |
| 11 | | 25.522 | ASP | 0.936 | | | | |
| 12 | Lens 6 | 12.036 | ASP | 0.804 | Plastic | 1.544 | 55.9 | −7.72 |
| 13 | | 3.041 | ASP | 0.800 | | | | |
| 14 | IR-cut filter | Plano | | 0.300 | Glass | 1.517 | 64.2 | — |
| 15 | | Plano | | 0.628 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −6.6279E−01 | −1.0000E+00 | −1.7921E+01 | −9.2320E−01 | −1.0000E+00 | 6.6699E−01 |
| A4 = | −1.1493E−03 | −7.4330E−03 | −1.5027E−02 | −2.3123E−02 | −1.1456E−02 | −1.1368E−02 |
| A6 = | −5.7746E−04 | −3.6398E−04 | 7.0124E−04 | 5.1548E−03 | 2.6614E−03 | 4.2576E−03 |
| A8 = | 3.6107E−05 | −7.5090E−04 | −1.1459E−03 | −1.5258E−03 | −7.0715E−04 | −2.4729E−03 |
| A10 = | −1.2100E−04 | 2.2893E−04 | 2.3248E−04 | 2.5433E−04 | 2.6189E−04 | 9.8874E−04 |
| A12 = | | −6.1412E−05 | −1.7694E−05 | −1.6685E−05 | −9.0827E−05 | −1.9325E−04 |
| A14 = | | | −8.0633E−07 | −6.3998E−08 | 1.5012E−05 | 1.7685E−05 |
| A16 = | | | | | −8.9067E−07 | −6.0085E−07 |

| Surface # | 8 | 9 | 10 | 11 | 12 | 13 |
|---|---|---|---|---|---|---|
| k = | −2.0733E+00 | −2.2812E+00 | −5.1616E+00 | 1.5599E+01 | −8.5979E+01 | −4.8869E+00 |
| A4 = | 2.3594E−02 | 1.0314E−02 | −4.5346E−03 | 3.1730E−03 | −1.5870E−02 | −9.9023E−03 |
| A6 = | −1.6796E−02 | −6.7023E−03 | 1.4074E−03 | −5.3507E−04 | 1.1222E−03 | 9.2950E−04 |
| A8 = | 6.0896E−03 | 2.1948E−03 | −2.6263E−04 | 5.3723E−05 | −2.7328E−05 | −6.2083E−05 |
| A10 = | −1.0808E−03 | −3.9527E−04 | 2.7564E−05 | −4.7146E−06 | 4.4067E−07 | 3.0533E−06 |
| A12 = | 1.0366E−04 | 4.2285E−05 | −1.8564E−06 | 1.9719E−07 | −4.4350E−08 | −1.0510E−07 |
| A14 = | −5.0980E−06 | −2.4351E−06 | 6.7813E−08 | −2.8951E−09 | 2.2333E−09 | 2.1313E−09 |
| A16 = | 9.5952E−08 | 5.7123E−08 | −9.7492E−10 | | −3.5133E−11 | −1.8525E−11 |

In the imaging lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| 4th Embodiment | | | |
|---|---|---|---|
| f [mm] | 6.74 | T56/CT6 | 1.16 |
| Fno | 2.40 | |R9/R10| | 0.11 |
| HFOV [deg.] | 41.7 | (R11 + R12)/(R11 − R12) | 1.68 |
| (V2 + V4)/V6 | 0.83 | f3/f1 | 0.57 |
| T12/CT1 | 1.20 | f × tan(HFOV) [mm] | 6.01 |
| T12/CT2 | 1.72 | | |

5th Embodiment

Figure 9:
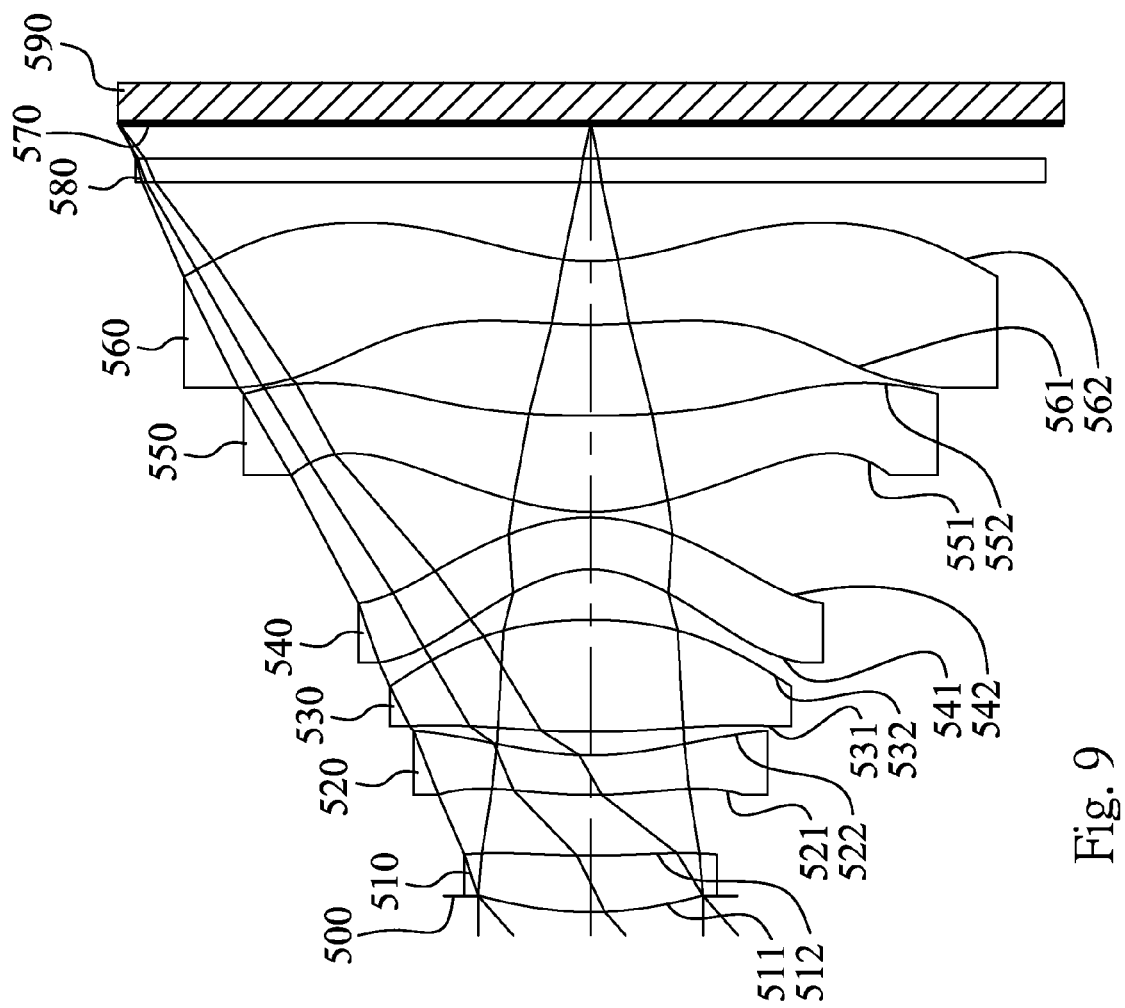
FIG. 9 is a schematic view of an imaging lens system according to the 5th embodiment of the present disclosure.
Figure 10:
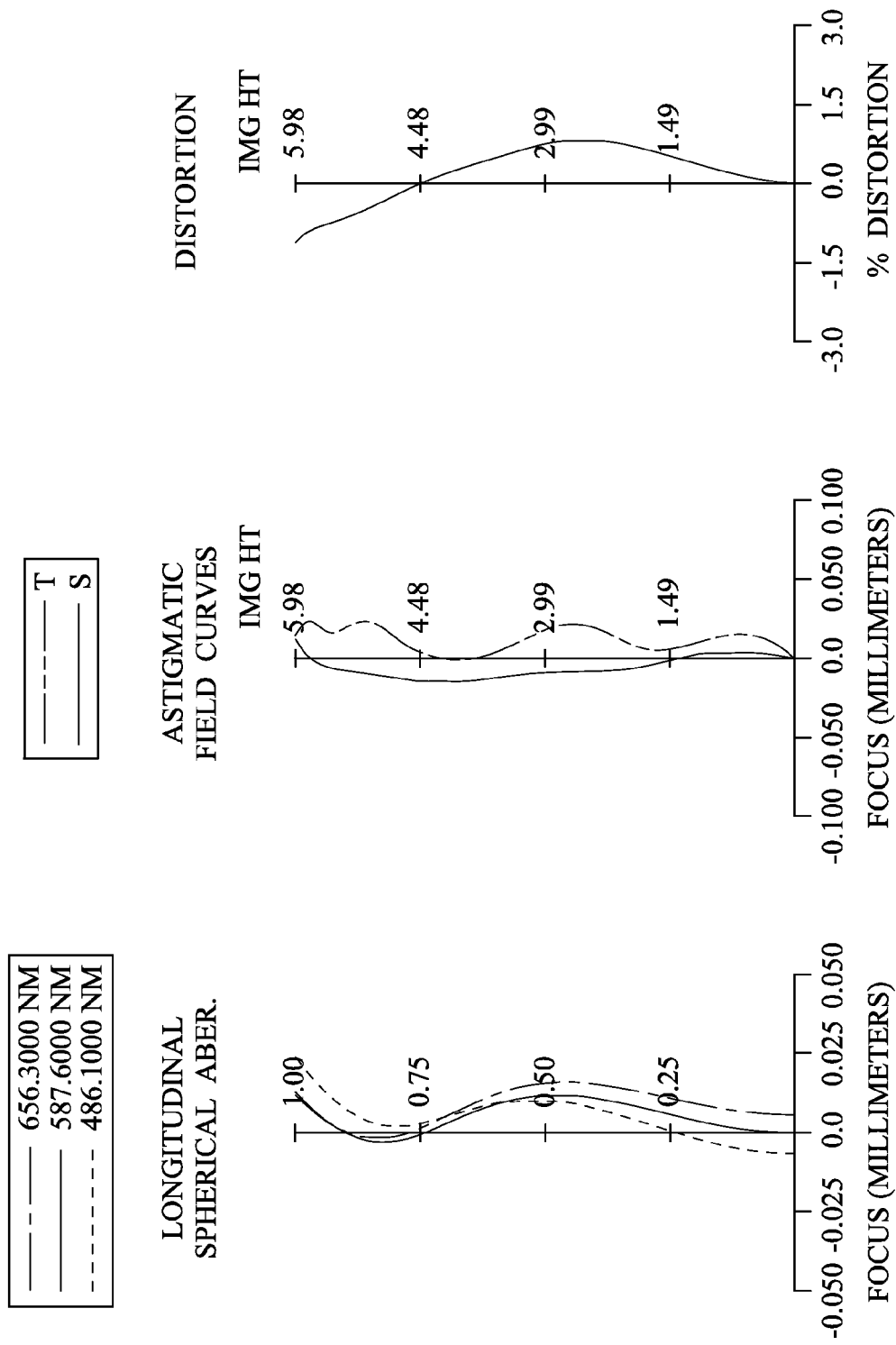
FIG. 10 shows spherical aberration curves, astigmatic field curves and a distortion curve of the imaging lens system according to the 5th embodiment.

FIG. 9 is a schematic view of an imaging lens system according to the 5th embodiment of the present disclosure. FIG. 10 shows spherical aberration curves, astigmatic field curves and a distortion curve of the imaging lens system according to the 5th embodiment. In FIG. 9, the imaging lens system includes six non-cemented lens elements with refractive power, in order from an object side to an image side, an aperture stop 500, a first lens element 510, a second lens element 520, a third lens element 530, a fourth lens element 540, a fifth lens element 550, a sixth lens element 560, an IR-cut filter 580, an image plane 570 and an image sensor 590, wherein the imaging lens system has a total of six lens elements with refractive power.

The first lens element 510 with positive refractive power has a convex object-side surface 511 and a concave image-side surface 512. The first lens element 510 is made of plastic material, and has the object-side surface 511 and the image-side surface 512 being both aspheric.

The second lens element 520 with negative refractive power has a convex object-side surface 521 and a concave image-side surface 522. The second lens element 520 is made of plastic material, and has the object-side surface 521 and the image-side surface 522 being both aspheric.

The third lens element 530 with positive refractive power has a convex object-side surface 531 and a convex image-side surface 532. The third lens element 530 is made of plastic material, and has the object-side surface 531 and the image-side surface 532 being both aspheric.

The fourth lens element 540 with negative refractive power has a concave object-side surface 541 and a convex image-side surface 542. The fourth lens element 540 is made of plastic material, and has the object-side surface 541 and the image-side surface 542 being both aspheric.

The fifth lens element 550 with positive refractive power has a convex object-side surface 551 in a paraxial region thereof and a concave image-side surface 552, wherein the object-side surface 551 of the fifth lens element 550 has a concave shape in an off-axis region thereof. The fifth lens element 550 is made of plastic material, and has the object-side surface 551 and the image-side surface 552 being both aspheric.

The sixth lens element 560 with negative refractive power has a convex object-side surface 561 and a concave image-side surface 562 in a paraxial region thereof, wherein the image-side surface 562 of the sixth lens element 560 has a convex shape in an off-axis region thereof. The sixth lens element 560 is made of plastic material, and has the object-side surface 561 and the image-side surface 562 being both aspheric.

The IR-cut filter 580 is made of glass material and located between the sixth lens element 560 and the image plane 570, and will not affect the focal length of the imaging lens system.

The detailed optical data of the 5th embodiment are shown in Table 9 and the aspheric surface data are shown in Table 10 below.

TABLE 9

5th Embodiment
f = 6.82 mm, Fno = 2.40, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.207 | | | | |
| 2 | Lens 1 | 4.503 | ASP | 0.718 | Plastic | 1.544 | 55.9 | 11.86 |
| 3 | | 14.065 | ASP | 0.766 | | | | |
| 4 | Lens 2 | 6.089 | ASP | 0.500 | Plastic | 1.640 | 23.3 | −18.61 |
| 5 | | 3.900 | ASP | 0.298 | | | | |
| 6 | Lens 3 | 10.498 | ASP | 1.415 | Plastic | 1.544 | 55.9 | 6.60 |
| 7 | | −5.201 | ASP | 0.640 | | | | |
| 8 | Lens 4 | −1.383 | ASP | 0.660 | Plastic | 1.640 | 23.3 | −7.91 |
| 9 | | −2.257 | ASP | 0.070 | | | | |
| 10 | Lens 5 | 2.979 | ASP | 1.217 | Plastic | 1.544 | 55.9 | 6.45 |
| 11 | | 16.789 | ASP | 1.151 | | | | |
| 12 | Lens 6 | 7.530 | ASP | 0.800 | Plastic | 1.544 | 55.9 | −8.43 |
| 13 | | 2.745 | ASP | 1.000 | | | | |
| 14 | IR-cut filter | Plano | | 0.300 | Glass | 1.517 | 64.2 | — |
| 15 | | Plano | | 0.445 | | | | |
| 16 | Image | Plano | | — | | | | |

Note:
Reference wavelength is 587.6 nm (d-line).

TABLE 10

Aspheric Coefficients

| | Surface # | | | | | |
|---|---|---|---|---|---|---|
| | 2 | 3 | 4 | 5 | 6 | 7 |
| k = | −9.8303E−01 | −1.0000E+00 | −1.6838E+01 | −8.4978E−01 | −1.0000E+00 | 1.0814E+00 |
| A4 = | −1.6192E−03 | −8.4040E−03 | −1.4032E−02 | −2.2954E−02 | −1.1006E−02 | −1.1079E−02 |
| A6 = | −5.5481E−04 | −1.9466E−04 | 9.9474E−04 | 5.1919E−03 | 2.3492E−03 | 3.9373E−03 |
| A8 = | −5.1723E−05 | −9.3468E−04 | −1.1693E−03 | −1.5213E−03 | −5.3706E−04 | −2.4237E−03 |
| A10 = | −9.3109E−05 | 2.8813E−04 | 2.3067E−04 | 2.5475E−04 | 1.2246E−04 | 8.8342E−04 |
| A12 = | | −5.5615E−05 | −1.1608E−05 | −1.6807E−05 | −2.6469E−05 | −1.4672E−04 |
| A14 = | | | −7.0094E−08 | 4.1745E−08 | 2.3106E−06 | 1.0202E−05 |
| A16 = | | | | | | −1.8451E−07 |

| | Surface # | | | | | |
|---|---|---|---|---|---|---|
| | 8 | 9 | 10 | 11 | 12 | 13 |
| k = | −2.0733E+00 | −2.2958E+00 | −6.1206E+00 | 1.2291E+01 | −2.0220E+01 | −5.2096E+00 |
| A4 = | 2.3077E−02 | 1.0940E−02 | 1.8437E−03 | 8.0291E−03 | −2.1366E−02 | −1.0980E−02 |
| A6 = | −1.4813E−02 | −6.8922E−03 | −2.1785E−04 | −6.8196E−04 | 2.6962E−03 | 1.1514E−03 |
| A8 = | 4.5175E−03 | 1.9778E−03 | −2.2497E−05 | −1.1978E−04 | −3.0482E−04 | −1.1031E−04 |
| A10 = | −5.0028E−04 | −2.6077E−04 | −4.8977E−06 | 2.2827E−05 | 2.6749E−05 | 7.8905E−06 |
| A12 = | −9.0514E−06 | 1.4132E−05 | 1.2671E−06 | −1.6251E−06 | −1.3971E−06 | −3.5786E−07 |
| A14 = | 5.9248E−06 | 1.4372E−07 | −9.6963E−08 | 5.5454E−08 | 3.8516E−08 | 8.8143E−09 |
| A16 = | −3.3050E−07 | −3.0482E−08 | 2.5336E−09 | −7.5502E−10 | −4.3899E−10 | −8.8538E−11 |

In the imaging lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| 5th Embodiment | | | |
|---|---|---|---|
| f [mm] | 6.82 | T56/CT6 | 1.44 |
| Fno | 2.40 | |R9/R10| | 0.18 |
| HFOV [deg.] | 41.5 | (R11 + R12)/(R11 − R12) | 2.15 |
| (V2 + V4)/V6 | 0.83 | f3/f1 | 0.56 |

-continued

| 5th Embodiment | | | |
|---|---|---|---|
| T12/CT1 | 1.07 | f × tan(HFOV) [mm] | 6.03 |
| T12/CT2 | 1.53 | | |

6th Embodiment

Figure 11:
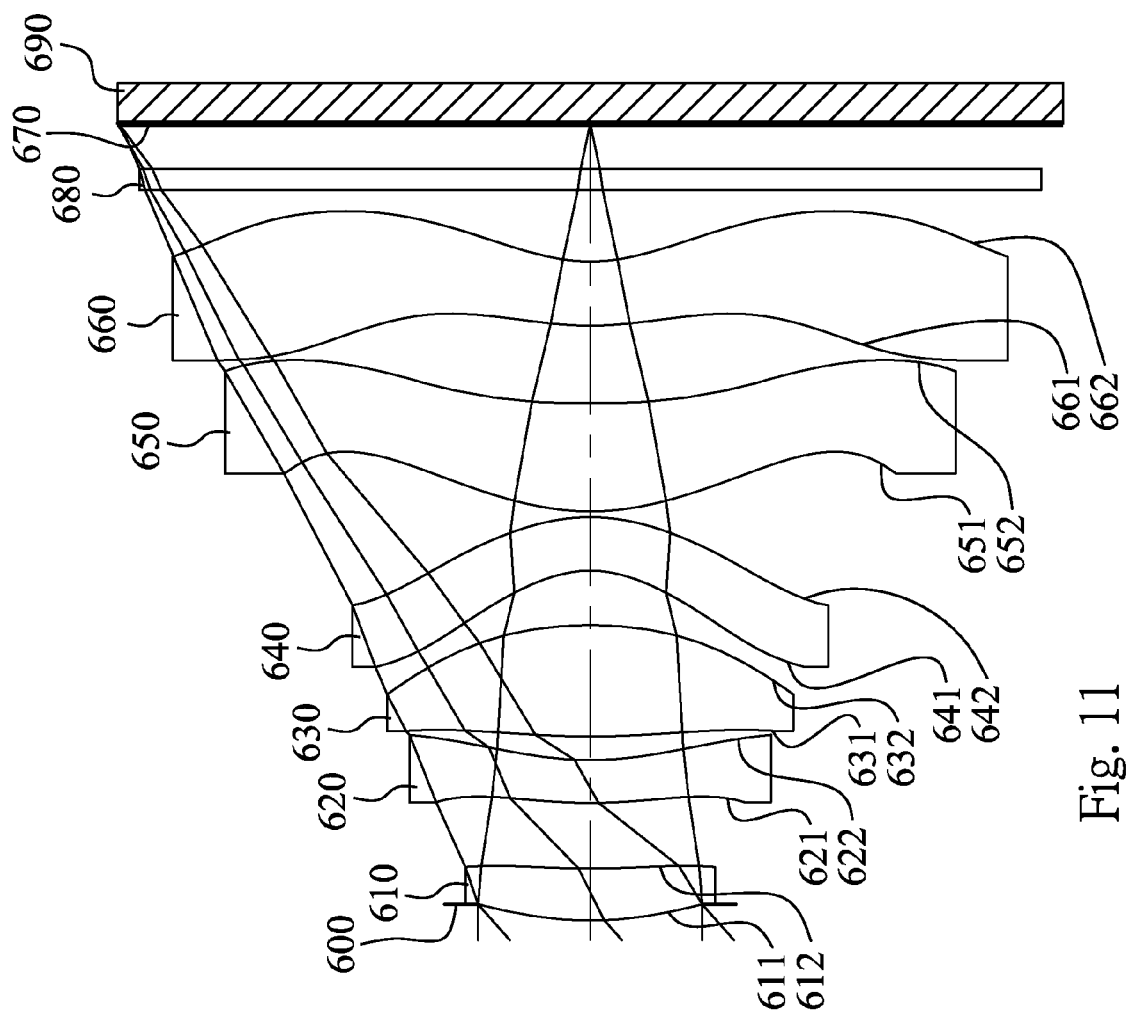
FIG. 11 is a schematic view of an imaging lens system according to the 6th embodiment of the present disclosure.
Figure 12:
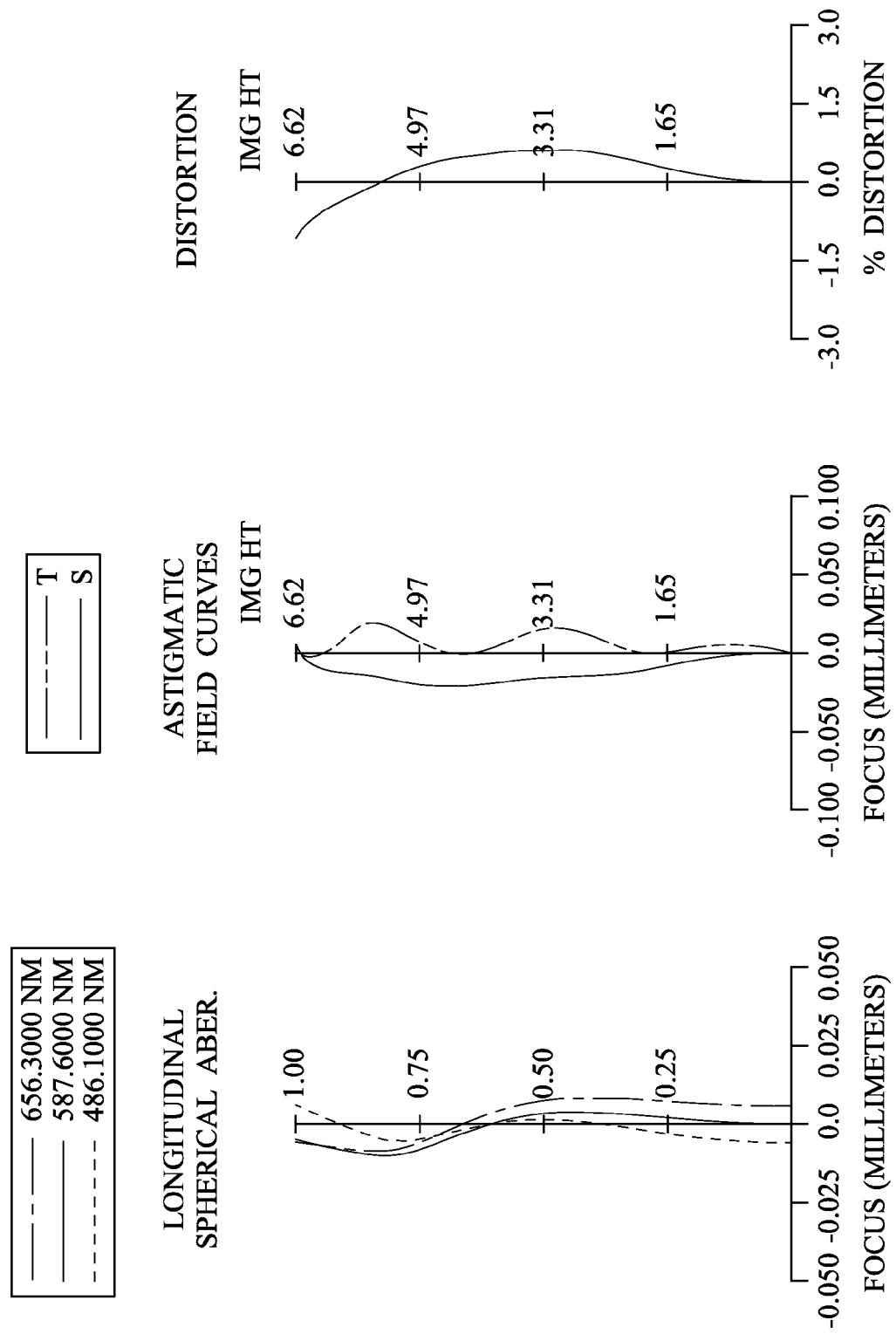
FIG. 12 shows spherical aberration curves, astigmatic field curves and a distortion curve of the imaging lens system according to the 6th embodiment.

FIG. 11 is a schematic view of an imaging lens system according to the 6th embodiment of the present disclosure. FIG. 12 shows spherical aberration curves, astigmatic field curves and a distortion curve of the imaging lens system according to the 6th embodiment. In FIG. 11, the imaging lens system includes six non-cemented lens elements with refractive power, in order from an object side to an image side, an aperture stop 600, a first lens element 610, a second lens element 620, a third lens element 630, a fourth lens element 640, a fifth lens element 650, a sixth lens element 660, an IR-cut filter 680, an image plane 670 and an image sensor 690, wherein the imaging lens system has a total of six lens elements with refractive power.

The first lens element 610 with positive refractive power has a convex object-side surface 611 and a concave image-side surface 612. The first lens element 610 is made of plastic material, and has the object-side surface 611 and the image-side surface 612 being both aspheric.

The second lens element 620 with negative refractive power has a convex object-side surface 621 and a concave image-side surface 622. The second lens element 620 is made of plastic material, and has the object-side surface 621 and the image-side surface 622 being both aspheric.

The third lens element 630 with positive refractive power has a convex object-side surface 631 and a convex image-side surface 632. The third lens element 630 is made of plastic material, and has the object-side surface 631 and the image-side surface 632 being both aspheric.

The fourth lens element 640 with negative refractive power has a concave object-side surface 641 and a convex image-side surface 642. The fourth lens element 640 is made of plastic material, and has the object-side surface 641 and the image-side surface 642 being both aspheric.

The fifth lens element 650 with positive refractive power has a convex object-side surface 651 in a paraxial region thereof and a concave image-side surface 652, wherein the object-side surface 651 of the fifth lens element 650 has a concave shape in an off-axis region thereof. The fifth lens element 650 is made of plastic material, and has the object-side surface 651 and the image-side surface 652 being both aspheric.

The sixth lens element 660 with negative refractive power has a convex object-side surface 661 and a concave image-side surface 662 in a paraxial region thereof, wherein the image-side surface 662 of the sixth lens element 660 has a convex shape in an off-axis region thereof. The sixth lens element 660 is made of plastic material, and has the object-side surface 661 and the image-side surface 662 being both aspheric.

The IR-cut filter 680 is made of glass material and located between the sixth lens element 660 and the image plane 670, and will not affect the focal length of the imaging lens system.

The detailed optical data of the 6th embodiment are shown in Table 11 and the aspheric surface data are shown in Table 12 below.

TABLE 11

6th Embodiment
f = 7.53 mm, Fno = 2.40, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.225 | | | | |
| 2 | Lens 1 | 5.000 | ASP | 0.730 | Plastic | 1.544 | 55.9 | 13.47 |
| 3 | | 14.925 | ASP | 0.919 | | | | |
| 4 | Lens 2 | 7.102 | ASP | 0.600 | Plastic | 1.640 | 23.3 | −21.34 |
| 5 | | 4.518 | ASP | 0.333 | | | | |
| 6 | Lens 3 | 11.660 | ASP | 1.557 | Plastic | 1.544 | 55.9 | 7.31 |
| 7 | | −5.757 | ASP | 0.766 | | | | |
| 8 | Lens 4 | −1.608 | ASP | 0.750 | Plastic | 1.640 | 23.3 | −8.72 |
| 9 | | −2.669 | ASP | 0.080 | | | | |
| 10 | Lens 5 | 3.495 | ASP | 1.519 | Plastic | 1.544 | 55.9 | 7.67 |
| 11 | | 18.233 | ASP | 1.085 | | | | |
| 12 | Lens 6 | 4.561 | ASP | 0.900 | Plastic | 1.544 | 55.9 | −10.94 |
| 13 | | 2.403 | ASP | 1.000 | | | | |
| 14 | IR-cut filter | Plano | | 0.300 | Glass | 1.517 | 64.2 | — |
| 15 | | Plano | | 0.633 | | | | |
| 16 | Image | Plano | | — | | | | |

Note:
Reference wavelength is 587.6 nm (d-line).

TABLE 12

Aspheric Coefficients

| | Surface # | | | | | |
|---|---|---|---|---|---|---|
| | 2 | 3 | 4 | 5 | 6 | 7 |
| k = | −1.1011E+00 | −1.0000E+00 | −1.6386E+01 | −7.4577E−01 | −1.0000E+00 | 1.0540E+00 |
| A4 = | −1.1844E−03 | −5.8548E−03 | −9.1285E−03 | −1.4728E−02 | −7.3964E−03 | −8.1218E−03 |
| A6 = | −4.7390E−04 | −3.4455E−04 | 4.7015E−04 | 2.4901E−03 | 1.0932E−03 | 2.6885E−03 |
| A8 = | 2.1442E−06 | −3.5183E−04 | −4.4111E−04 | −5.6013E−04 | −1.9784E−04 | −1.1206E−03 |
| A10 = | −4.5044E−05 | 8.5207E−05 | 5.9088E−05 | 6.9860E−05 | 3.3745E−05 | 2.5538E−04 |
| A12 = | | −1.6564E−05 | −2.0942E−06 | −3.4055E−06 | −5.3806E−06 | −2.4733E−05 |
| A14 = | | | 7.0644E−08 | 9.3433E−09 | 3.6227E−07 | 6.3706E−07 |
| A16 = | | | | | | 2.1903E−08 |

TABLE 12-continued

Aspheric Coefficients

| Surface # | | | | | |
|---|---|---|---|---|---|
| 8 | 9 | 10 | 11 | 12 | 13 |
| k = −2.0483E+00 | −2.2454E+00 | −6.0498E+00 | 1.0654E+01 | −1.0594E+01 | −4.1434E+00 |
| A4 = 7.7434E−03 | 3.8246E−03 | 3.5059E−03 | 9.8284E−03 | −1.2724E−02 | −8.9671E−03 |
| A6 = −7.7622E−04 | −9.9497E−04 | −6.5287E−04 | −1.3123E−03 | 8.7724E−04 | 7.6012E−04 |
| A8 = −9.5895E−04 | −3.2943E−05 | 4.9497E−05 | 6.3453E−05 | −5.0908E−05 | −5.5152E−05 |
| A10 = 4.3061E−04 | 5.5323E−05 | −5.2134E−06 | −7.8384E−07 | 3.1706E−06 | 2.9652E−06 |
| A12 = −6.9569E−05 | −8.6271E−06 | 4.2612E−07 | −5.5103E−08 | −1.3114E−07 | −1.0247E−07 |
| A14 = 5.1061E−06 | 5.6529E−07 | −1.9142E−08 | 2.4477E−09 | 2.8268E−09 | 1.9516E−09 |
| A16 = −1.4461E−07 | −1.4042E−08 | 3.4434E−10 | −3.1352E−11 | −2.4596E−11 | −1.5279E−11 |

In the imaging lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| 6th Embodiment | | | |
|---|---|---|---|
| f [mm] | 7.53 | T56/CT6 | 1.21 |
| Fno | 2.40 | |R9/R10| | 0.19 |
| HFOV [deg.] | 41.6 | (R11 + R12)/(R11 − R12) | 3.23 |
| (V2 + V4)/V6 | 0.83 | f3/f1 | 0.54 |
| T12/CT1 | 1.26 | f × tan(HFOV) [mm] | 6.69 |
| T12/CT2 | 1.53 | | |

7th Embodiment

Figure 13:
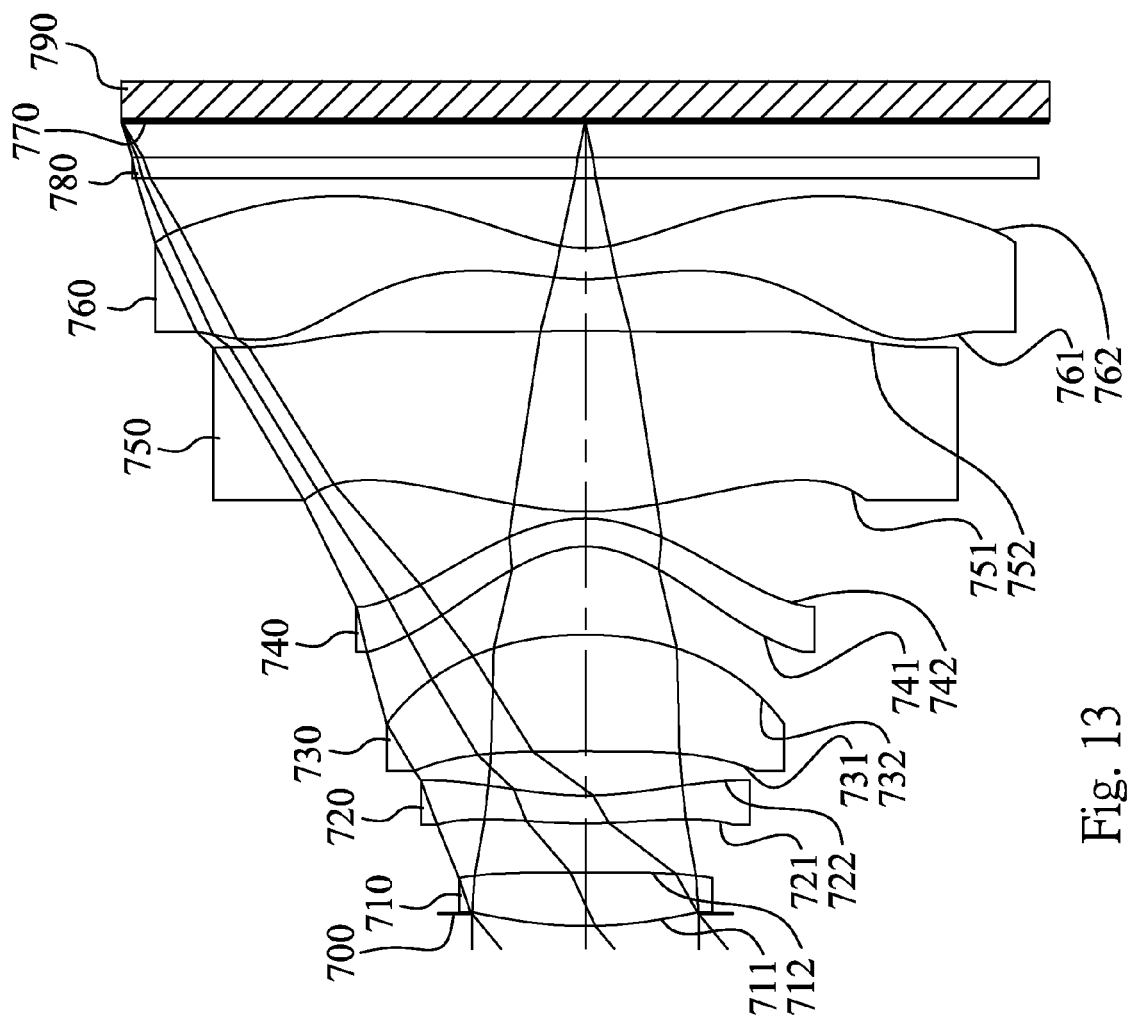
FIG. 13 is a schematic view of an imaging lens system according to the 7th embodiment of the present disclosure.
Figure 14:
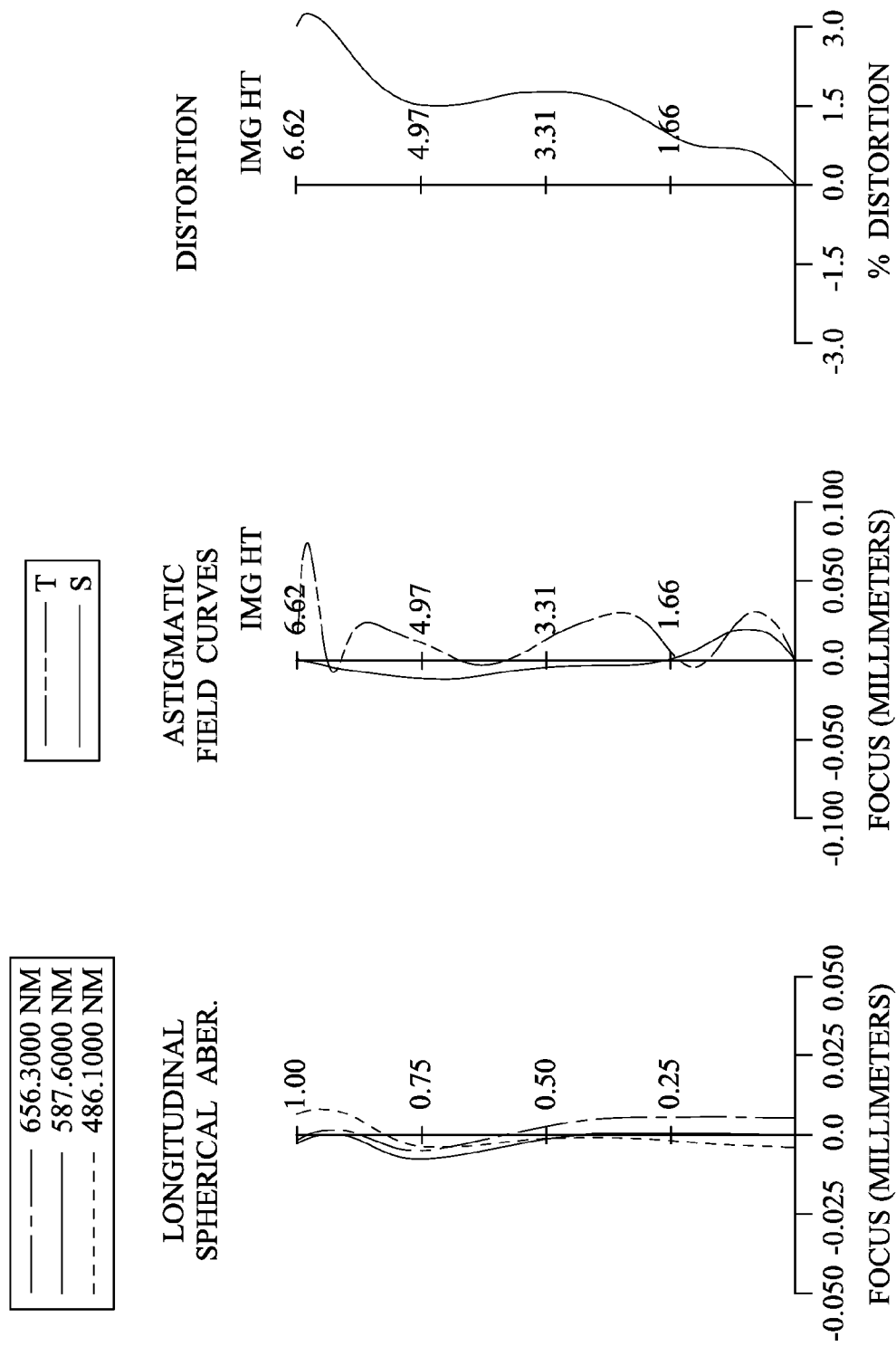
FIG. 14 shows spherical aberration curves, astigmatic field curves and a distortion curve of the imaging lens system according to the 7th embodiment.

FIG. 13 is a schematic view of an imaging lens system according to the 7th embodiment of the present disclosure. FIG. 14 shows spherical aberration curves, astigmatic field curves and a distortion curve of the imaging lens system according to the 7th embodiment. In FIG. 13, the imaging lens system includes six non-cemented lens elements with refractive power, in order from an object side to an image side, an aperture stop 700, a first lens element 710, a second lens element 720, a third lens element 730, a fourth lens element 740, a fifth lens element 750, a sixth lens element 760, an IR-cut filter 780, an image plane 770 and an image sensor 790, wherein the imaging lens system has a total of six lens elements with refractive power.

The first lens element 710 with positive refractive power has a convex object-side surface 711 and a convex image-side surface 712. The first lens element 710 is made of plastic material, and has the object-side surface 711 and the image-side surface 712 being both aspheric.

The second lens element 720 with negative refractive power has a convex object-side surface 721 and a concave image-side surface 722. The second lens element 720 is made of plastic material, and has the object-side surface 721 and the image-side surface 722 being both aspheric.

The third lens element 730 with positive refractive power has a concave object-side surface 731 and a convex image-side surface 732. The third lens element 730 is made of plastic material, and has the object-side surface 731 and the image-side surface 732 being both aspheric.

The fourth lens element 740 with negative refractive power has a concave object-side surface 741 and a convex image-side surface 742. The fourth lens element 740 is made of plastic material, and has the object-side surface 741 and the image-side surface 742 being both aspheric.

The fifth lens element 750 with positive refractive power has a convex object-side surface 751 in a paraxial region thereof and a convex image-side surface 752, wherein the object-side surface 751 of the fifth lens element 750 has a concave shape in an off-axis region thereof. The fifth lens element 750 is made of plastic material, and has the object-side surface 751 and the image-side surface 752 being both aspheric.

The sixth lens element 760 with negative refractive power has a convex object-side surface 761 and a concave image-side surface 762 in a paraxial region thereof, wherein the image-side surface 762 of the sixth lens element 760 has a convex shape in an off-axis region thereof. The sixth lens element 760 is made of plastic material, and has the object-side surface 761 and the image-side surface 762 being both aspheric.

The IR-cut filter 780 is made of glass material and located between the sixth lens element 760 and the image plane 770, and will not affect the focal length of the imaging lens system.

The detailed optical data of the 7th embodiment are shown in Table 13 and the aspheric surface data are shown in Table 14 below.

TABLE 13

7th Embodiment
f = 7.76 mm, Fno = 2.40, HFOV = 39.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.175 | | | | |
| 2 | Lens 1 | 6.090 | ASP | 0.766 | Plastic | 1.544 | 55.9 | 10.59 |
| 3 | | −101.613 | ASP | 0.700 | | | | |
| 4 | Lens 2 | 8.311 | ASP | 0.400 | Plastic | 1.650 | 21.5 | −20.20 |
| 5 | | 4.995 | ASP | 0.630 | | | | |
| 6 | Lens 3 | −98.799 | ASP | 1.664 | Plastic | 1.544 | 55.9 | 9.98 |

TABLE 13-continued

7th Embodiment
f = 7.76 mm, Fno = 2.40, HFOV = 39.6 deg.

| Surface # | | Curvature Radius | | Thickness | Material | Index | Abbe # | Focal Length |
|---|---|---|---|---|---|---|---|---|
| 7 | | −5.180 | ASP | 1.263 | | | | |
| 8 | Lens 4 | −1.470 | ASP | 0.400 | Plastic | 1.650 | 21.5 | −11.94 |
| 9 | | −2.008 | ASP | 0.100 | | | | |
| 10 | Lens 5 | 4.649 | ASP | 2.582 | Plastic | 1.544 | 55.9 | 7.38 |
| 11 | | −23.659 | ASP | 0.735 | | | | |
| 12 | Lens 6 | 3.204 | ASP | 0.444 | Plastic | 1.544 | 55.9 | −7.79 |
| 13 | | 1.735 | ASP | 1.000 | | | | |
| 14 | IR-cut filter | Plano | | 0.300 | Glass | 1.517 | 64.2 | — |
| 15 | | Plano | | 0.515 | | | | |
| 16 | Image | Plano | | — | | | | |

Note:
Reference wavelength is 587.6 nm (d-line).

TABLE 14

Aspheric Coefficients

| | Surface # | | | | | |
|---|---|---|---|---|---|---|
| | 2 | 3 | 4 | 5 | 6 | 7 |
| k = | −5.3596E−01 | −1.0000E+00 | −3.6055E+01 | −1.9700E+00 | −3.1673E−01 | 9.2384E−01 |
| A4 = | −6.9829E−04 | −3.1759E−03 | −9.5786E−03 | −1.5755E−02 | −7.1568E−03 | −9.1590E−03 |
| A6 = | −5.3430E−04 | −6.2828E−05 | 5.9300E−04 | 2.4673E−03 | 1.0907E−03 | 2.7943E−03 |
| A8 = | 7.9189E−05 | −3.5579E−04 | −3.6992E−04 | −5.4439E−04 | −8.4660E−04 | −1.1661E−03 |
| A10 = | −4.9023E−05 | 8.8959E−05 | 6.4144E−05 | 6.8174E−05 | 3.2532E−04 | 2.9128E−04 |
| A12 = | | −1.6539E−05 | −4.3941E−06 | −3.2960E−06 | −6.8228E−05 | −3.7393E−05 |
| A14 = | | | −1.1422E−07 | 3.6310E−08 | 7.0601E−06 | 2.2011E−06 |
| A16 = | | | | | −2.7399E−07 | −4.4999E−08 |

| | Surface # | | | | | |
|---|---|---|---|---|---|---|
| | 8 | 9 | 10 | 11 | 12 | 13 |
| k = | −2.0301E+00 | −2.5993E+00 | −6.3564E+00 | 1.5494E+01 | −2.6283E+01 | −6.1770E+00 |
| A4 = | 5.9623E−03 | 2.0097E−03 | −5.4930E−03 | 6.5038E−03 | −1.9807E−02 | −6.7207E−03 |
| A6 = | −1.4620E−03 | −9.6669E−04 | 8.8904E−04 | −5.6517E−04 | 2.8861E−03 | 6.0282E−04 |
| A8 = | −1.3003E−04 | 1.0146E−04 | −1.3794E−04 | 2.5039E−06 | −3.1197E−04 | −4.7491E−05 |
| A10 = | 1.9644E−04 | 4.1759E−05 | 1.1746E−05 | 1.3852E−06 | 2.0513E−05 | 2.5209E−06 |
| A12 = | −3.8976E−05 | −8.7916E−06 | −5.3228E−07 | −5.2265E−08 | −7.4159E−07 | −7.9865E−08 |
| A14 = | 3.0606E−06 | 5.9707E−07 | 9.2069E−09 | 5.7110E−10 | 1.3729E−08 | 1.3642E−09 |
| A16 = | −8.6196E−08 | −1.3193E−08 | 1.1654E−11 | | −1.0248E−10 | −9.6728E−12 |

In the imaging lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| 7th Embodiment | | | |
|---|---|---|---|
| f [mm] | 7.76 | T56/CT6 | 1.66 |
| Fno | 2.40 | |R9/R10| | 0.20 |
| HFOV [deg.] | 39.6 | (R11 + R12)/(R11 − R12) | 3.36 |
| (V2 + V4)/V6 | 0.77 | f3/f1 | 0.94 |
| T12/CT1 | 0.91 | f × tan(HFOV) [mm] | 6.42 |
| T12/CT2 | 1.75 | | |

8th Embodiment

Figure 15:
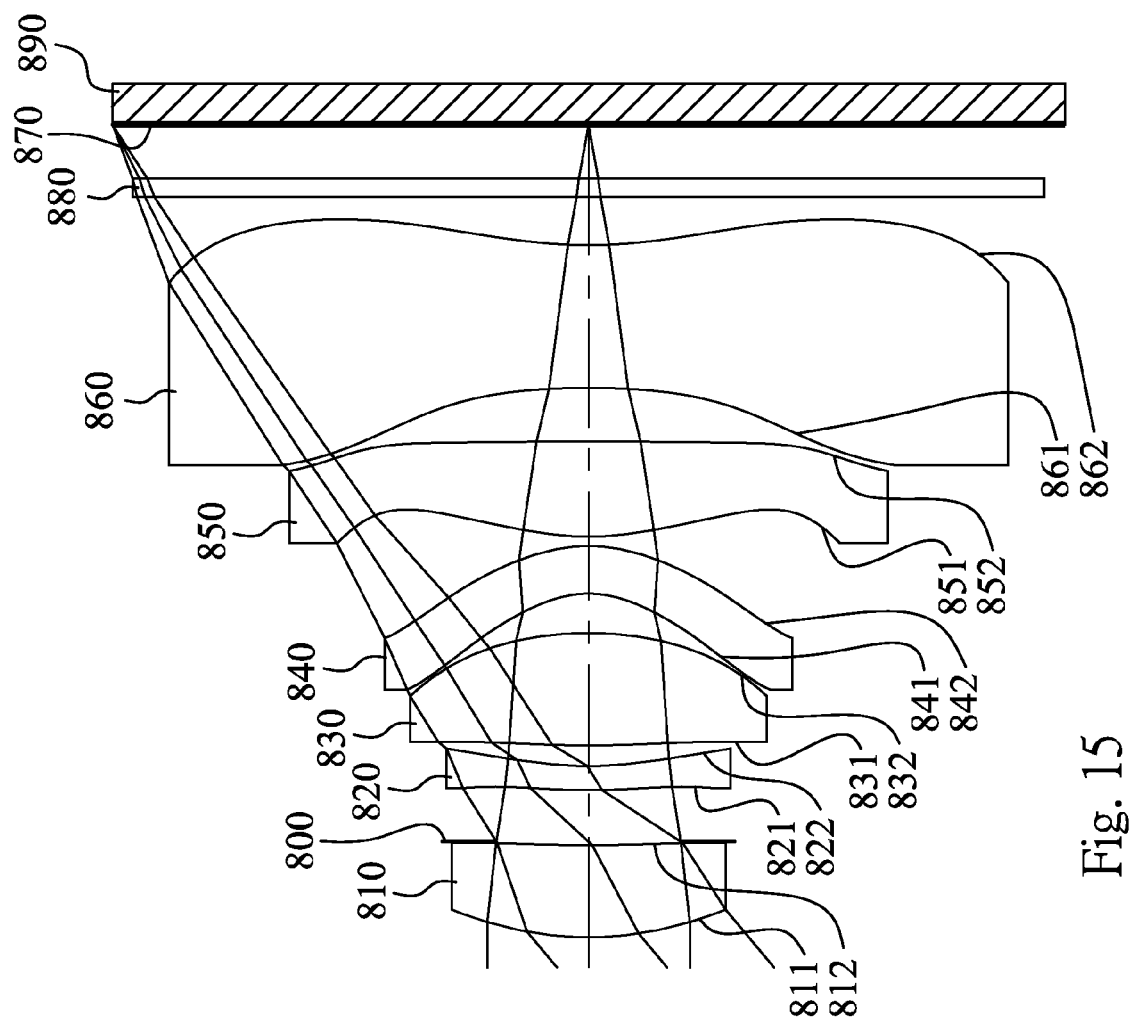
FIG. 15 is a schematic view of an imaging lens system according to the 8th embodiment of the present disclosure.
Figure 16:
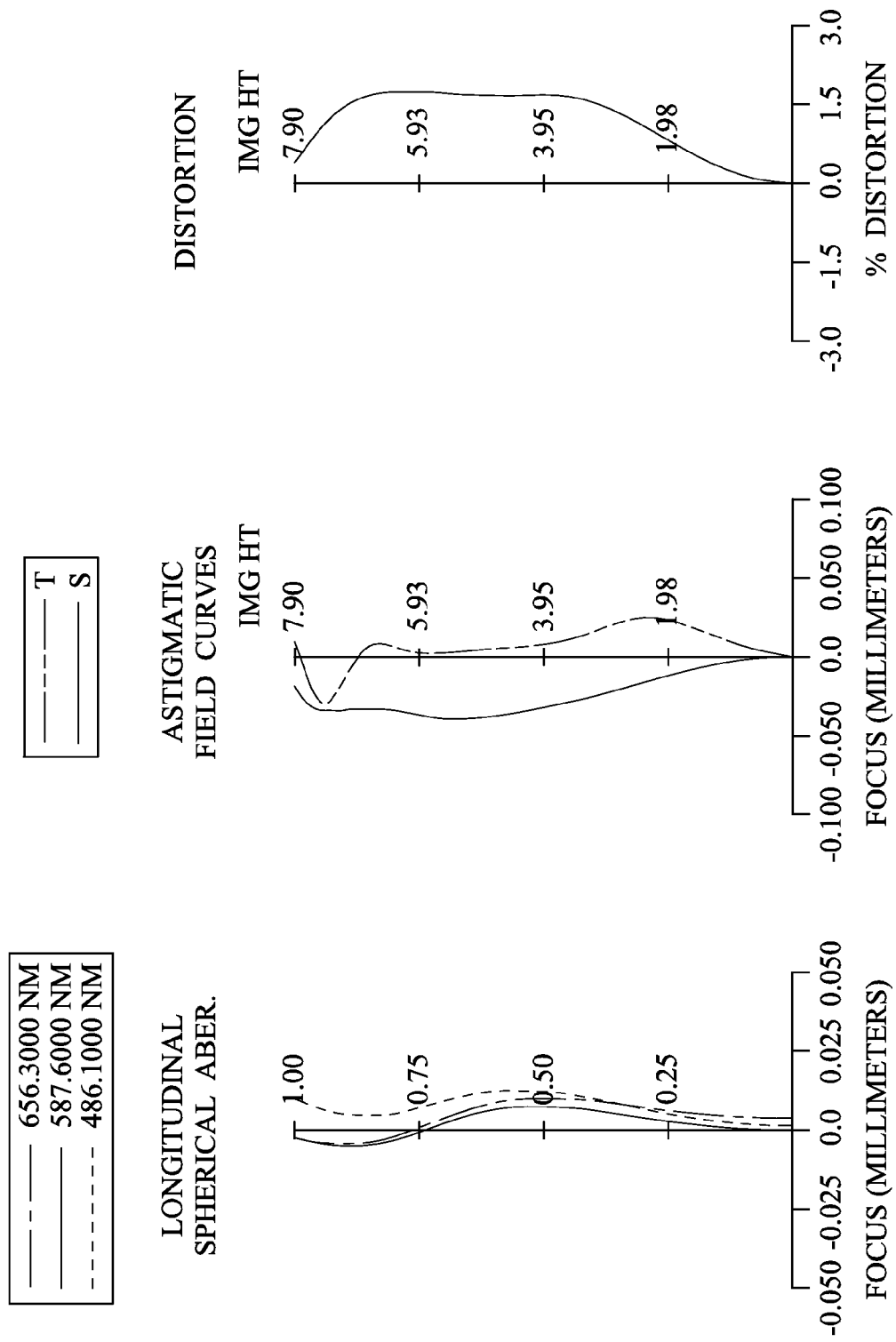
FIG. 16 shows spherical aberration curves, astigmatic field curves and a distortion curve of the imaging lens system according to the 8th embodiment.

FIG. 15 is a schematic view of an imaging lens system according to the 8th embodiment of the present disclosure. FIG. 16 shows spherical aberration curves, astigmatic field curves and a distortion curve of the imaging lens system according to the 8th embodiment. In FIG. 15, the imaging lens system includes six non-cemented lens elements with refractive power, in order from an object side to an image side, a first lens element 810, an aperture stop 800, a second lens element 820, a third lens element 830, a fourth lens element 840, a fifth lens element 850, a sixth lens element 860, an IR-cut filter 880, an image plane 870 and an image sensor 890, wherein the imaging lens system has a total of six lens elements with refractive power.

The first lens element 810 with positive refractive power has a convex object-side surface 811 and a concave image-side surface 812. The first lens element 810 is made of glass material, and has the object-side surface 811 and the image-side surface 812 being both aspheric.

The second lens element 820 with negative refractive power has a convex object-side surface 821 and a concave image-side surface 822. The second lens element 820 is made of plastic material, and has the object-side surface 821 and the image-side surface 822 being both aspheric.

The third lens element 830 with positive refractive power has a convex object-side surface 831 and a convex image-side surface 832. The third lens element 830 is made of plastic material, and has the object-side surface 831 and the image-side surface 832 being both aspheric.

The fourth lens element 840 with negative refractive power has a concave object-side surface 841 and a convex image-side surface 842. The fourth lens element 840 is made of plastic material, and has the object-side surface 841 and the image-side surface 842 being both aspheric.

The fifth lens element 850 with positive refractive power has a convex object-side surface 851 in a paraxial region thereof and a planar image-side surface 852, wherein the object-side surface 851 of the fifth lens element 850 has a concave shape in an off-axis region thereof. The fifth lens element 850 is made of plastic material, and has the object-side surface 851 and the image-side surface 852 being both aspheric.

The sixth lens element 860 with negative refractive power has a concave object-side surface 861 and a concave image-side surface 862 in a paraxial region thereof, wherein the image-side surface 862 of the sixth lens element 860 has a convex shape in an off-axis region thereof. The sixth lens element 860 is made of plastic material, and has the object-side surface 861 and the image-side surface 862 being both aspheric.

The IR-cut filter 880 is made of glass material and located between the sixth lens element 860 and the image plane 870, and will not affect the focal length of the imaging lens system.

The detailed optical data of the 8th embodiment are shown in Table 15 and the aspheric surface data are shown in Table 16 below.

TABLE 15

8th Embodiment
f = 9.41 mm, Fno = 2.80, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.646 | ASP | 1.529 | Glass | 1.587 | 59.5 | 12.19 |
| 2 | | 24.048 | ASP | 0.059 | | | | |
| 3 | Ape. Stop | Plano | | 0.857 | | | | |
| 4 | Lens 2 | 10.778 | ASP | 0.400 | Plastic | 1.640 | 23.3 | −21.92 |
| 5 | | 6.006 | ASP | 0.343 | | | | |
| 6 | Lens 3 | 18.735 | ASP | 1.866 | Plastic | 1.535 | 55.7 | 8.62 |
| 7 | | −5.903 | ASP | 0.656 | | | | |
| 8 | Lens 4 | −1.693 | ASP | 0.790 | Plastic | 1.640 | 23.3 | −10.79 |
| 9 | | −2.652 | ASP | 0.156 | | | | |
| 10 | Lens 5 | 4.603 | ASP | 1.578 | Plastic | 1.535 | 55.7 | 8.60 |
| 11 | | ∞ | ASP | 0.892 | | | | |
| 12 | Lens 6 | −13.870 | ASP | 2.374 | Plastic | 1.544 | 55.9 | −9.07 |
| 13 | | 8.120 | ASP | 0.800 | | | | |
| 14 | IR-cut filter | Plano | | 0.300 | Glass | 1.517 | 64.2 | — |
| 15 | | Plano | | 0.900 | | | | |
| 16 | Image | Plano | | — | | | | |

Note:
Reference wavelength is 587.6 nm (d-line).

TABLE 16

Aspheric Coefficients

| | Surface # | | | | | |
|---|---|---|---|---|---|---|
| | 1 | 2 | 4 | 5 | 6 | 7 |
| k = | −3.2504E−01 | −4.1514E+01 | −4.2050E+01 | 1.8936E+00 | 4.9145E+00 | 1.0595E+00 |
| A4 = | 6.8875E−06 | −1.2393E−03 | −6.6525E−03 | −1.1454E−02 | −3.1021E−03 | −1.7683E−03 |
| A6 = | −1.6378E−05 | 9.7646E−05 | 4.4418E−04 | 1.3832E−03 | 1.4160E−04 | 4.7616E−05 |
| A8 = | −4.8234E−06 | −2.3094E−04 | −1.7586E−04 | −2.5432E−04 | −2.0643E−05 | −8.0984E−05 |
| A10 = | −1.4269E−06 | 8.1444E−05 | 3.1130E−05 | 3.6251E−05 | −2.8915E−06 | 1.9314E−05 |
| A12 = | | −1.1517E−05 | −4.0952E−06 | −3.1142E−06 | 6.4568E−07 | −1.9290E−06 |
| A14 = | | | 1.3872E−07 | 1.1253E−07 | −2.0380E−08 | 7.0945E−08 |

| | Surface # | | | | | |
|---|---|---|---|---|---|---|
| | 8 | 9 | 10 | 11 | 12 | 13 |
| k = | −2.7430E+00 | −3.2440E+00 | −1.0568E+01 | 0.0000E+00 | 2.7389E+00 | −1.8093E−01 |
| A4 = | −5.5142E−03 | −3.2984E−03 | −3.4041E−03 | −1.9452E−03 | −3.3709E−03 | −2.9508E−03 |
| A6 = | 1.7432E−04 | −3.9394E−05 | 8.5820E−04 | 3.8637E−04 | −1.2791E−04 | 1.5950E−05 |
| A8 = | 1.3124E−05 | 1.2973E−05 | −1.5643E−04 | −1.8730E−05 | 3.8014E−05 | 2.4193E−06 |
| A10 = | 3.6809E−06 | 3.3667E−07 | 1.6028E−05 | −2.0185E−06 | −2.1446E−06 | −1.0574E−07 |
| A12 = | −2.4174E−08 | 1.3619E−08 | −1.1521E−06 | 2.0925E−07 | 5.7844E−08 | 1.9207E−09 |
| A14 = | −1.2473E−08 | 3.6148E−10 | 4.6596E−08 | −6.5682E−09 | −7.7820E−10 | −1.7491E−11 |
| A16 = | | | −7.4977E−10 | 7.0195E−11 | 3.9913E−12 | 6.0921E−14 |

In the imaging lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| 8th Embodiment | | | |
|---|---|---|---|
| f [mm] | 9.41 | T56/CT6 | 0.38 |
| Fno | 2.80 | |R9/R10| | 0.00 |
| HFOV [deg.] | 39.9 | (R11 + R12)/(R11 − R12) | 0.26 |
| (V2 + V4)/V6 | 0.83 | f3/f1 | 0.71 |
| T12/CT1 | 0.60 | f × tan(HFOV) [mm] | 7.87 |
| T12/CT2 | 2.29 | | |

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the invention and its practical applications, to thereby enable others skilled in the art to best utilize the invention and various embodiments with various modifications as are suited to the particular use contemplated. The embodiments depicted above and the appended drawings are exemplary and are not intended to be exhaustive or to limit the scope of the present disclosure or invention to the precise forms disclosed. Many modifications and variations are possible in view of the above teachings.

What is claimed is:

1. An imaging lens system comprising six non-cemented lens elements with refractive power, in order from an object side to an image side:
a first lens element having positive refractive power;
a second lens element having negative refractive power;
a third lens element having positive refractive power;
a fourth lens element with refractive power having a concave object-side surface and a convex image-side surface;
a fifth lens element with positive refractive power having a convex object-side surface, wherein the object-side surface and an image-side surface of the fifth lens element are aspheric; and
a sixth lens element with refractive power having a concave image-side surface in a paraxial region thereof, wherein the image-side surface of the sixth lens element has at least one convex shape in an off-axis region thereof, and an object-side surface and the image-side surface of the sixth lens element are aspheric;
wherein the imaging lens system has a total of six lens elements with refractive power, a focal length of the first lens element is f1, a focal length of the third lens element is f3, a curvature radius of the object-side surface of the fifth lens element is R9, a curvature radius of the image-side surface of the fifth lens element is R10, a curvature radius of the object-side surface of the sixth lens element is R11, a curvature radius of the image-side surface of the sixth lens element is R12, and the following relationships are satisfied:

$0 < f3/f1 < 1.1;$ $|R9/R10| < 1.0;$ and $-1.0 < (R11+R12)/(R11-R12) < 2.75.$

2. The imaging lens system of claim 1, wherein the fourth lens element has negative refractive power, and the sixth lens element has negative refractive power.

3. The imaging lens system of claim 2, wherein the first lens element has a convex object-side surface and a concave image-side surface.

4. The imaging lens system of claim 2, wherein the object-side surface of the fifth lens element has at least one concave shape in an off-axis region thereof, and the image-side surface of the fifth lens element has at least one convex shape in an off-axis region thereof.

5. The imaging lens system of claim 2, wherein an Abbe number of the second lens element is V2, an Abbe number of the fourth lens element is V4, an Abbe number of the sixth lens element is V6, and the following relationship is satisfied:

$0.60 < (V2+V4)/V6 < 1.10.$

6. The imaging lens system of claim 5, further comprising:
a stop located between an imaged object and the second lens element; and at least three lens elements among the first through sixth lens elements are made of plastic material.

7. The imaging lens system of claim 1, wherein the object-side surface of the sixth lens element is convex.

8. The imaging lens system of claim 1, wherein a central thickness of the second lens element is CT2, an axial distance between the first lens element and the second lens element is T12, and the following relationship is satisfied:

$1.20 < T12/CT2 < 3.0.$

9. The imaging lens system of claim 1, wherein a central thickness of the first lens element is CT1, an axial distance between the first lens element and the second lens element is T12, and the following relationship is satisfied:

$0.90 < T12/CT1 < 3.0.$

10. The imaging lens system of claim 1, wherein the focal length of the first lens element is f1, the focal length of the third lens element is f3, and the following relationship is satisfied:

$0.20 < f3/f1 < 0.85.$

11. The imaging lens system of claim 1, wherein an axial distance between the fifth lens element and the sixth lens element is T56, a central thickness of the sixth lens element is CT6, and the following relationship is satisfied:

$0.8 < T56/CT6 < 2.5.$

12. An image capturing device, comprising:
the imaging lens system as set forth herein in claim 1; and
an image sensor located on an image plane side of said imaging lens system.

13. An imaging lens system comprising six non-cemented lens elements with refractive power, in order from an object side to an image side:
a first lens element with positive refractive power having a convex object-side surface and a concave image-side surface;
a second lens element having negative refractive power;
a third lens element having positive refractive power;
a fourth lens element with refractive power having a concave object-side surface and a convex image-side surface;
a fifth lens element with refractive power having a convex object-side surface, wherein the object-side surface and an image-side surface of the fifth lens element are aspheric; and a sixth lens element with refractive power having a concave image-side surface in a paraxial region thereof, wherein the image-side surface of the sixth lens element has at least one convex shape in an off-axis region thereof, and an object-side surface and the image-side surface of the sixth lens element are aspheric;

wherein the imaging lens system has a total of six lens elements with refractive power, a focal length of the first lens element is f1, a focal length of the third lens element is f3, a curvature radius of the object-side surface of the fifth lens element is R9, a curvature radius of the image-side surface of the fifth lens element is R10, a curvature radius of the object-side surface of the sixth lens element is R11, a curvature radius of the image-side surface of the sixth lens element is R12, and the following relationships are satisfied:

$0 < f3/f1 < 1.1;$ $|R9/R10| < 3.0;$ and $-1.0 < (R11+R12)/(R11-R12) \leq 2.15.$ 14. The imaging lens system of claim 13, wherein the curvature radius of the object-side surface of the sixth lens element is R11, the curvature radius of the image-side surface of the sixth lens element is R12, and the following relationship is satisfied:

$-1.0 < (R11+R12)/(R11-R12) \leq 1.68.$

15. The imaging lens system of claim 13, wherein a central thickness of the first lens element is CT1, an axial distance between the first lens element and the second lens element is T12, and the following relationship is satisfied:

$0.90 < T12/CT1 < 3.0.$

16. The imaging lens system of claim 13, wherein the focal length of the first lens element is f1, the focal length of the third lens element is f3, and the following relationship is satisfied:

$0.20 < f3/f1 < 0.85.$

17. The imaging lens system of claim 13, wherein an axial distance between the fifth lens element and the sixth lens element is T56, a central thickness of the sixth lens element is CT6, and the following relationship is satisfied:

$0.8 < T56/CT6 < 2.5.$

18. The imaging lens system of claim 13, wherein the fourth lens element has negative refractive power.

19. The imaging lens system of claim 13, wherein the fifth lens element has positive refractive power.

20. The imaging lens system of claim 19, wherein at least three lens elements among the first through sixth lens elements are made of plastic material, a focal length of the imaging lens system is f, a half of a maximal field of view of the imaging lens system is HFOV, and the following relationship is satisfied:

5.5 mm < f×Tan(HFOV) < 10 mm.

21. An image capturing device, comprising:
the imaging lens system as set forth herein in claim 13; and
an image sensor located on an image plane side of said imaging lens system.

22. An imaging lens system comprising six non-cemented lens elements with refractive power, in order from an object side to an image side:
a first lens element having positive refractive power;
a second lens element having negative refractive power;
a third lens element having positive refractive power;
a fourth lens element with negative refractive power having a concave object-side surface and a convex image-side surface;
a fifth lens element with refractive power having a convex object-side surface, wherein the object-side surface and an image-side surface of the fifth lens element are aspheric; and
a sixth lens element with refractive power having a concave image-side surface in a paraxial region thereof, wherein the image-side surface of the sixth lens element has at least one convex shape in an off-axis region thereof, and an object-side surface and the image-side surface of the sixth lens element are aspheric;

wherein the imaging lens system has a total of six lens elements with refractive power, a focal length of the first lens element is f1, a focal length of the third lens element is f3, a curvature radius of the object-side surface of the fifth lens element is R9, a curvature radius of the image-side surface of the fifth lens element is R10, a curvature radius of the object-side surface of the sixth lens element is R11, a curvature radius of the image-side surface of the sixth lens element is R12, and the following relationships are satisfied:

$0 < f3/f1 < 1.1;$ $|R9/R10| < 3.0;$ and $0.35 \leq (R11+R12)/(R11-R12) < 2.75.$ 23. The imaging lens system of claim 22, wherein the object-side surface of the sixth lens element is convex.

24. The imaging lens system of claim 22, wherein the image-side surface of the fifth lens element is concave in a paraxial region thereof and has at least one convex shape in an off-axis region thereof.

25. The imaging lens system of claim 22, wherein an Abbe number of the second lens element is V2, an Abbe number of the fourth lens element is V4, an Abbe number of the sixth lens element is V6, and the following relationship is satisfied:

$0.60 < (V2+V4)/V6 < 1.10.$

26. The imaging lens system of claim 22, wherein at least three lens elements among the first through sixth lens elements are made of plastic material, a focal length of the imaging lens system is f, a half of a maximal field of view of the imaging lens system is HFOV, and the following relationship is satisfied:

5.5 mm < f×Tan(HFOV) < 10 mm.

27. The imaging lens system of claim 22, wherein an axial distance between the fifth lens element and the sixth lens element is T56, a central thickness of the sixth lens element is CT6, and the following relationship is satisfied:

$0.8 < T56/CT6 < 2.5.$

28. The imaging lens system of claim 22, wherein the fifth lens element has positive refractive power, the curvature radius of the object-side surface of the fifth lens element is R9, the curvature radius of the image-side surface of the fifth lens element is R10, and the following relationship is satisfied:

$|R9/R10| < 1.0.$

29. The imaging lens system of claim 22, wherein the first lens element has a convex object-side surface and a concave image-side surface.

30. An image capturing device, comprising:
the imaging lens system as set forth herein in claim 22; and
an image sensor located on an image plane side of said imaging lens system.

* * * * *